(12) United States Patent
Kinas

(10) Patent No.: US 7,645,014 B2
(45) Date of Patent: Jan. 12, 2010

(54) INFRARED LIGHT ABSORBENT DYE

(75) Inventor: Erick B. Kinas, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 557 days.

(21) Appl. No.: 11/445,519

(22) Filed: Jun. 2, 2006

(65) Prior Publication Data

US 2007/0279466 A1 Dec. 6, 2007

(51) Int. Cl.
*B41J 29/393* (2006.01)
(52) U.S. Cl. .......................................... 347/19
(58) Field of Classification Search ............. 347/19
See application file for complete search history.

(56) References Cited

U.S. PATENT DOCUMENTS

| 5,600,350 A * | 2/1997 | Cobbs et al. ............... 347/19 |
| 5,841,955 A | 11/1998 | Wang |
| 5,990,197 A | 11/1999 | Escano et al. |
| 6,012,390 A | 1/2000 | Ott et al. |
| 6,149,719 A | 11/2000 | Houle |
| 6,221,279 B1 | 4/2001 | Strand et al. |
| 6,378,976 B1 * | 4/2002 | Byers et al. ............... 347/19 |
| 6,481,816 B1 * | 11/2002 | Oyen ......................... 347/12 |
| 6,644,764 B2 | 11/2003 | Stephens, Jr. |
| 6,926,764 B2 | 8/2005 | Bleikolm et al. |
| 2002/0148386 A1 | 10/2002 | Woosman et al. |
| 2003/0218648 A1 * | 11/2003 | Barnes et al. ............ 347/19 |
| 2004/0253419 A1 * | 12/2004 | Bleikolm et al. ........ 428/195.1 |
| 2005/0006454 A1 | 1/2005 | Silverbrook et al. |
| 2005/0106365 A1 | 5/2005 | Palmer et al. |
| 2005/0157111 A1 | 7/2005 | Silverbrook |
| 2005/0201809 A1 | 9/2005 | Silverbrook |
| 2006/0030638 A1 | 2/2006 | Vonwiller et al. |
| 2006/0050120 A1 | 3/2006 | Jackson |

FOREIGN PATENT DOCUMENTS

JP 2002-363454 * 12/2002

* cited by examiner

*Primary Examiner*—Julian D Huffman

(57) ABSTRACT

Embodiments for use with infrared light absorbent dyes are disclosed.

19 Claims, 12 Drawing Sheets

| Dye | λmax reported, nm | λmax measured (nm, water) | Measured ε L/gm-cm |
|---|---|---|---|
| SDA4927 | 822 | 835 | 270 |
| SDA6122 | 901 | 915 | 180 |
| SDA8680 | 868 | 880 | 110 |
| SDA8700 | 844 | 860 | 229 |
| SDA8737 | 910 | 920 | 18 |

INFRARED LIGHT ABSORBENT DYE

INTRODUCTION

Using a single light source in combination with a single light detector can be used to calibrate a first ink pen relative to a second ink pen in an inkjet printing device. However, in some instances, the usage of a single light source may not provide the correct information for accurate calibration because different color inks ejected from different ink pens can have different light absorbance characteristics.

DETAILED DESCRIPTION

To maintain print quality, ejection of ink from nozzles of ink pens in inkjet printing devices can be calibrated so as to, for example, compensate for misalignment of a nozzle and/or an ink pen relative to another nozzle and/or ink pen. Compensation also can be made for a particular nozzle that is not ejecting ink, a relative drop weight inconsistency and/or an ink load difference, among other things. Assessment of such relative differences can be performed by analysis of a pattern on a medium resulting from deposit of ink drops ejected from the nozzles.

Accordingly, in some embodiments of the present disclosure, nozzles and/or ink pens in an inkjet printing device can be calibrated by ejecting at least one drop of ink onto a medium from at least two ink pens containing different colors of the ink and an infrared (IR) light absorbent dye. Locations on the medium at which the at least one drop from the at least two ink pens are intended to impact and have actually impacted can be illuminated with an IR light source, and the absorbance of the IR light can be measured with a sensor of IR light intensity.

Figure 1:
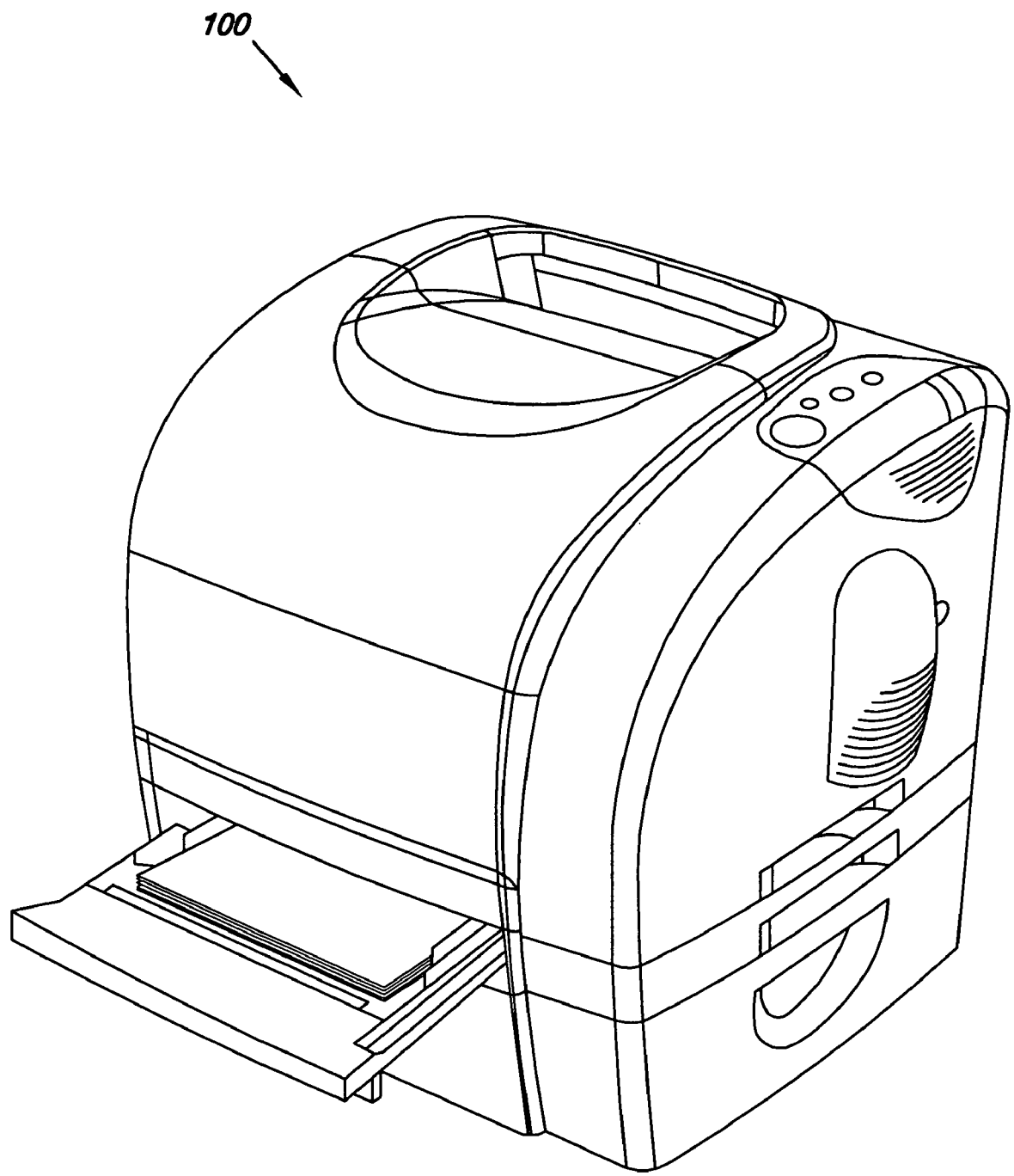
FIG. 1 illustrates an embodiment of a printing device.

FIG. 1 illustrates an embodiment of a printing device. FIG. 1 illustrates a printing device 100 that can print monochrome and/or multicolor images, including textual characters, on a medium (e.g., paper and/or transparent film).

In such embodiments, the printing device 100 can use data obtained from an image source on which color separation has been performed. Other examples of output devices include monochrome and/or multicolor copiers, and monochrome and/or multicolor multi-function-peripherals, among other monochrome and/or multicolor printing devices.

Printing devices can use various printing techniques in order to print on a medium. For example, printing devices can print on media by using techniques such as ejecting ink drops by firing ink jets and/or by using toner and a laser. Different embodiments of printing devices, including inkjet and laser printing devices, can print monochrome and/or multicolor images, including monochrome and/or multicolor characters.

Inkjet printing devices can use various ink colors in printing. Printing devices can use, for example, colors such as cyan (C), magenta (M), yellow (Y), and black (K), among other colors. Printing devices can use any number of colors in various combinations for printing images.

In some devices, the same ink color can be used in different formulations having varying dye loads to enable a smooth transition in color intensity in printed images. The same ink color also can be applied to a medium in different drop weights to enable a smooth transition in color intensity.

Each ink color, dye load, and/or drop weight can be assigned to a separate ink pen, which also can have multiple nozzles through which ink can be ejected. It can become more difficult to calibrate various parameters related to ink output (e.g., alignment) the more ink pens and/or nozzles an inkjet printing device has.

Various embodiments of the present disclosure can assist in cross-calibrating multiple ink pens and/or nozzles (e.g., alignment of a first ink pen using magenta ink relative to a second ink pen using cyan ink). To contribute to various types of calibration described below, analysis of ink drops deposited on the medium can be performed by illuminating particular locations in a print pattern with a light source, using a sensor of light intensity to measure a level of reflected and/or transmitted light and using a logic component to correlate light intensity measurements with particular locations, and provide executable instructions for adjustment of ink drop ejection based thereon.

As used herein, the term executable instructions can be used to describe the various suitable manners in which particular data can be used to determine an outcome. For example, executable instructions can be provided by a logic component in which the circuitry of the component determines an outcome based upon a number of inputs.

Such logic can be provided by hardwired circuitry and/or firmware, for example. Logic components can also include processors and computer systems, wherein computer executable instructions can be utilized to accomplish one or more functions described herein.

In some situations, a light emitting diode (LED) can be used as the light source. An LED can be designed to emit light within a particular range of wavelengths. A unit of measurement for use in measuring wavelengths is nanometers (nm), among other types of measurement. Light of a particular wavelength can be perceived as being a particular color.

Particular ink formulations have characteristic patterns of light absorbance, transmittance, and reflectance that, in combination, can determine the color perceived by a human eye. For example, black ink can absorb and/or transmit nearly all visible light, and reflect little, in a spectrum visible to the human eye, which accounts for the black ink being perceived as having no color.

A particular wavelength, or a particular range and/or pattern of wavelengths, absorbed by a particular ink formulation can be determined from an intensity measurement of the particular wavelength being emitted directly from the light source compared to an intensity measurement of the particular wavelength being reflected from and/or transmitted through the particular ink formulation deposited on a medium. Alternatively, an intensity of the particular wavelength reflected from and/or transmitted through a white medium, which can reflect nearly all visible light, and absorb and/or transmit little, can be compared to an intensity measurement of the particular wavelength being reflected from and/or transmitted through the particular ink formulation in order to determine the absorbance.

Using an LED to emit a defined visible wavelength range can result in difficulties in calibrating an inkjet printing device with nozzles that eject more than one color and/or formulation of ink because the different inks can have different levels of absorbance of the wavelength range emitted by the LED. This can differentially affect the intensity level of the reflected and/or transmitted light detected by the sensor and, thus, negatively affect the ability to calibrate ejection from ink pen nozzles. For example, an LED that emits wavelengths perceived as blue light can be effectively used for calibrating an ink pen ejecting magenta ink relative to an ink pen ejecting yellow ink because magenta and yellow inks can, in some formulations, both effectively absorb blue light.

In contrast, blue light is weakly absorbed by cyan ink, in some formulations, which can present an obstacle in using a blue LED to calibrate an ink pen ejecting cyan ink relative to an ink pen ejecting magenta and/or yellow ink. In addition, calibration of a nozzle and/or ink pen using an ink with a low visible dye load relative to a nozzle and/or ink pen using an ink with a high visible dye load can be compromised by markedly different absorbance levels, which may fall outside an effective sensitivity range of the sensor being used to detect reflection and/or transmission.

Dyes exist that absorb light in the near IR spectrum (e.g., from about 750 nm to about 940 nm) and that absorb little light in the visible spectrum. Such dyes can be termed IR absorbent dyes because each has a peak level of absorbance within the IR spectrum.

Conversely, an ink having a visible color can be formulated so as to absorb little or no IR light. For example, magenta ink and yellow ink can have low absorbance of light throughout the IR spectrum. By comparison, in some formulations, cyan ink can have a notable absorbance of shorter wavelength IR light (e.g., near a boundary with visible red light) with an absorbance decreasing to a low level as the IR wavelength increases toward 940 nm.

An IR absorbent dye can be combined with one or more visible color ink formulations to allow a first nozzle and/or ink pen to be calibrated, and in some embodiments calibrated relative to a second nozzle and/or ink pen. In various embodiments, a single LED can be used as an IR light source and a single IR sensor can be used to detect an intensity of IR reflection and/or transmission, which can be indicative of absorption by the IR absorbent dye. Based thereon, in some embodiments of the present disclosure, nozzles and/or ink pens in an inkjet printing device can be calibrated by including a concentration of an IR light absorbent dye in mixtures with ink from at least one ink pen having multiple nozzles, ejecting at least one drop onto a medium from at least one of the multiple nozzles, illuminating a location on the medium at which the at least one drop has impacted the medium with an IR light source, measuring absorbance of the IR light with a sensor of IR light intensity, and calibrating the ink pen firing based upon the measured absorbance.

Figure 2:
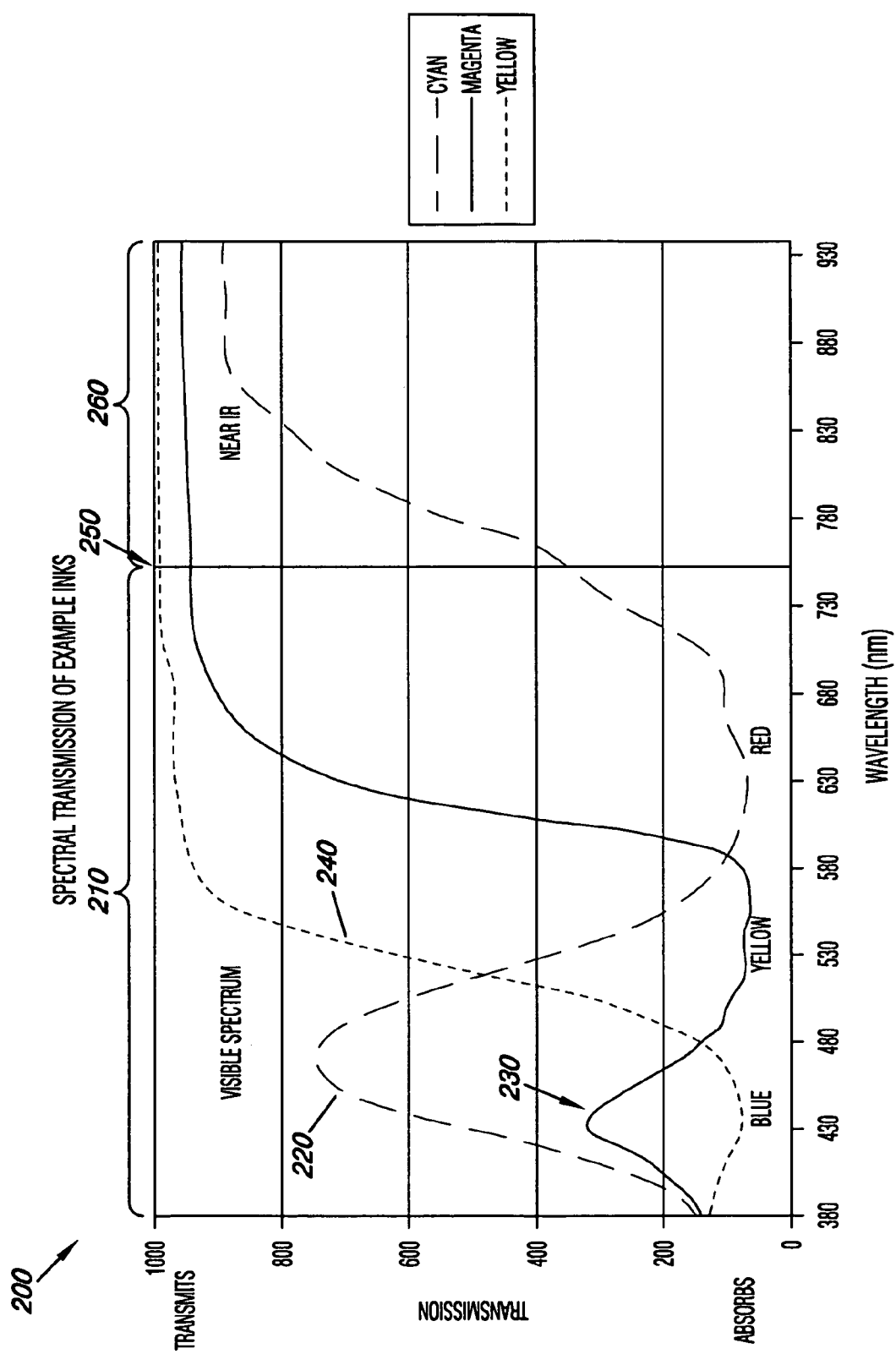
FIG. 2 illustrates a representation of spectral transmission of exemplary inks according to an embodiment of the present disclosure.

FIG. 2 illustrates a representation of spectral transmission of exemplary inks according to an embodiment of the present disclosure. The graph 200 shown in FIG. 2 illustrates transmission through exemplary dyes of a spectrum of light ranging through wavelengths from about 380 nm to about 940 nm. As identified near the top of the graph, this range of wavelengths encompasses a visible spectrum 210 and a near IR spectrum 260.

The visible spectrum 210 can be perceived by the human eye as including the complete gamut of visible light, which encompasses blue, yellow, and red lights, as identified near the horizontal axis. The IR spectrum 260 is generally invisible to an unaided human eye. An approximate wavelength boundary separating the visible and IR spectra is shown as a vertical line 250 intersecting the horizontal axis at around 750 nm.

Transmission of light from zero to 100% through an ink, as quantified from 0 to 1000 on the vertical axis, can be conceptualized as an inverse function of absorption of light by the ink. Accordingly, the maximum level of transmission is labeled as 1000 on the vertical axis and the minimum level of transmission is labeled as 0, which also can be interpreted as the minimum level of absorbance being labeled as 1000 and the maximum level of absorbance being labeled as 0. For clarification, the upper region of the vertical axis is labeled "Transmits" and the lower region is labeled "Absorbs".

As shown in FIG. 2, an exemplary magenta ink 230 can have a moderate level of transmission in the lower wavelengths of the visible spectrum 210, with a peak near blue, and a low level of transmission in the middle wavelengths, with a peak near yellow, and a high level of transmission in the upper wavelengths of the visible spectrum, which becomes high around red and remains high throughout the near IR spectrum 260. The transmission profile for the exemplary magenta ink 230 corresponds to a moderate absorption around blue, a high absorption around yellow, and a low level absorption from red through IR.

As further shown in FIG. 2, an exemplary yellow ink 240 can have a low level wavelength transmission around blue that becomes a high level transmission around yellow and remains so throughout red and IR. The transmission profile for the exemplary yellow ink 240 corresponds to a high level absorption of wavelengths around blue and a low level absorption of wavelengths from around yellow and higher, including substantially all wavelengths in the IR spectrum 260.

FIG. 2 illustrates that an exemplary cyan ink 220 can have a high level transmission in the lower wavelengths of the visible spectrum 210, with a peak near blue, and a low level of transmission (i.e., a high level of absorbance) in the upper wavelengths of the visible spectrum 210 from yellow to red. The exemplary cyan ink 220 shown in FIG. 2 can have a transmission that increases as red wavelengths increase and continues to increase as wavelengths increase in the near IR spectrum 260.

However, as shown in the graph 200 near the visible light boundary 250, the absorption of IR light remains notably high in the shorter wavelengths of the near IR spectrum 260. Although absorption of IR light by the exemplary cyan ink 220 decreases as IR wavelengths increase, the absorption by the cyan ink 220 remains notably higher than that of the magenta ink 230 and the yellow ink 240 even at around 940 nm.

As can be seen in the graph 200 in FIG. 2, the various transmission and absorption peaks are spread throughout the visible spectrum 210 for the exemplary magenta 230, yellow 240, and cyan 220 inks, therefore making it difficult to use a single wavelength, or range of wavelengths, for calibration of ink pens and/or nozzles using these ink colors. However, to choose a wavelength that among a number of ink colors has relative uniformity in transmission and absorption characteristics, a wavelength in the IR spectrum 260 can be selected. In this manner, having an IR absorbent dye that can be combined with various ink colors to provide relative uniformity in detectable absorbance at a wavelength in the IR spectrum can assist in calibration of ink pens and/or nozzles.

Figure 3:
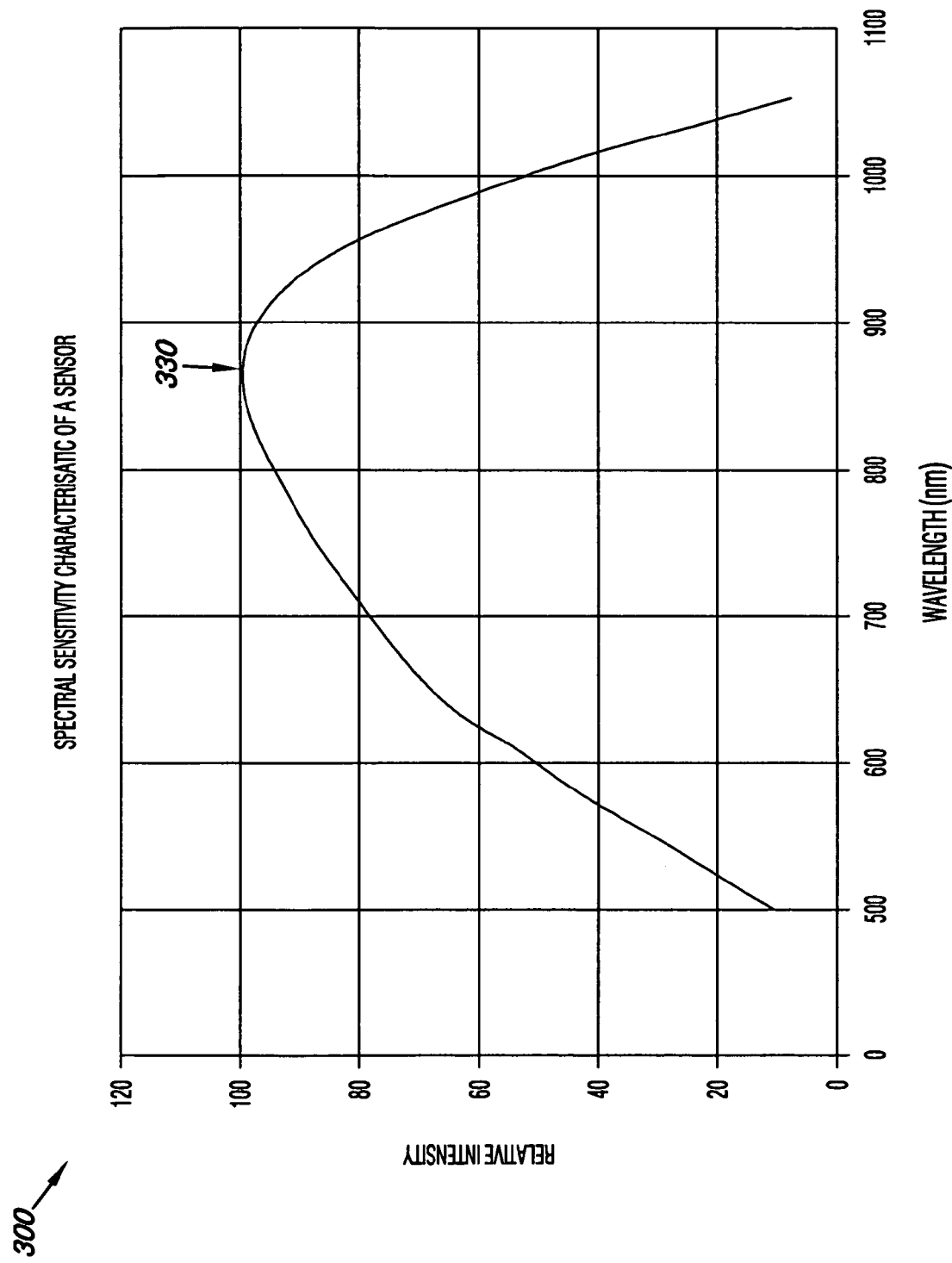
FIG. 3 illustrates a representation of spectral sensitivity characteristic of an exemplary sensor according to an embodiment of the present disclosure.

FIG. 3 illustrates a representation of spectral sensitivity characteristic of an exemplary sensor according to an embodiment of the present disclosure. The graph 300 shown in FIG. 3 illustrates relative intensity of detection, as shown on the vertical axis, of a spectrum of light wavelengths, as shown on the horizontal axis, by an exemplary sensor of light intensity.

By way of example and not by way of limitation, the exemplary sensor of FIG. 3 detects a maximum relative intensity of 100 and a minimum of 0. However, an intensity scale of any particular sensor can be calibrated in any suitable manner so as to distinguish detection of a high level of light intensity from a low level of light intensity.

The spectral sensitivity of the exemplary sensor of FIG. 3 has a peak sensitivity 330 at a wavelength of around 870 nm in the IR spectrum, although a sensor can have adequate sensitivity to a broad range of wavelengths (e.g., as shown in FIG. 3). A light source having a particular emission range can be matched with a particular IR intensity sensor having peak wavelength sensitivity near the emission range of the light source in order to increase the likelihood of detection.

For example, a sensor with characteristics as shown in graph 300 of FIG. 3 may be used with LEDs emitting 850, 872, 895, and/or 940 nm, among others. Sensors can be designed to have peak sensitivities at various wavelengths and/or ranges of detection throughout the ultraviolet, visible, and/or IR spectra and one or more of such sensors can be used in combination with embodiments of the present disclosure.

One type of sensor can detect a relative light intensity that is assigned a numerical value, which can be used as a measurement to compare levels of relative light transmission and/or reflection, from which a measurement of relative absorbance can be derived. In various embodiments of the present disclosure, a source of IR light and a sensor of IR light intensity can be located on the same or opposite sides of a medium to measure absorbance of the medium and/or ink, with or without an IR absorbent dye, by transmission through the medium and/or ink.

In some embodiments, a sensor can have a relative intensity scale ranging from 0 to 1000. In such an embodiment, an exemplary ink formulation deposited on a medium can have a transmission measurement in the IR spectrum of 950 counts on such a scale.

The 950 count transmission can also be viewed as a 50 count absorption measurement. A 50 count absorption measurement is at the low end of a 1000 count range for absorption and, taking into account characteristics common to electronic sensors, variations in IR light absorbance can be difficult to measure for deposited ink drops coming from different nozzles and/or ink pens.

Decreasing the IR transmission count (e.g., causing a signal drop) measured by an IR intensity sensor by, for example, around 200-300 counts can put the measurement just described into a middle region of the relative intensity scale that is more sensitive to upward and downward variations in intensity. For example, an ink formulation with a 950 count transmission in the IR spectrum can have an IR absorbent dye added to the composition that provides a 250 count signal drop, thereby resulting in a 700 transmission count, or a 300 absorbance count.

Figure 4:
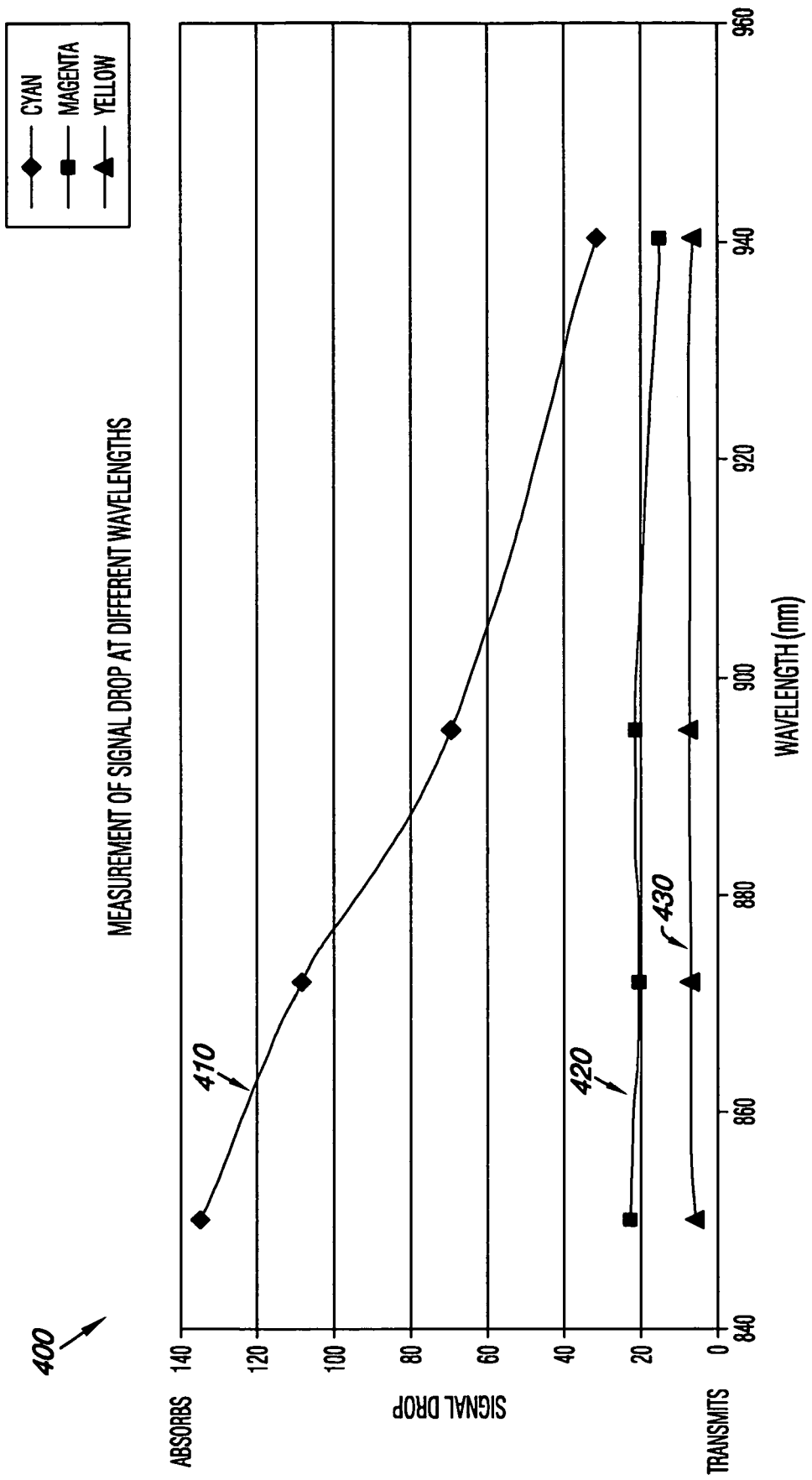
FIG. 4 illustrates a representation of a measurement of signal drop in transmission for exemplary inks at different wavelengths according to an embodiment of the present disclosure.

FIG. 4 illustrates a representation of a measurement of signal drop in transmission for exemplary inks at different wavelengths according to an embodiment of the present disclosure. The graph 400 shown in FIG. 4 illustrates, on the vertical axis, measurement of relative signal drop counts provided by absorbance by exemplary ink formulations across a range of IR light wavelengths shown on the horizontal axis. Absorbance profiles for IR light ranging from around 850 nm to around 940 nm are shown for exemplary cyan ink 410, magenta ink 420, and yellow ink 430 formulations that are not mixed with an IR absorbent dye.

A signal drop graph such as graph 400 of FIG. 4 can be used as an indicator of how much IR absorbent dye to combine with a particular ink color formulation in order to equate a combined signal for the dye and ink with a signal resulting from absorbance of another ink formulation at a particular IR wavelength. For example, at 850 nm, graph 400 shows that a concentration of IR absorbent dye sufficient to increase absorbance of the magenta ink 420 by 115 counts can be added to the magenta ink 420 to result in an absorbance equivalent to that of the cyan ink 410.

As shown in FIG. 4 by way of example and not by way of limitation, at wavelengths around 850 nm the exemplary cyan ink 410 can absorb more light relative to the exemplary magenta ink 420 and the exemplary yellow ink 430 than the cyan ink 410 does relative to the magenta ink 420 and the yellow ink 430 at wavelengths around 940 nm. In the graph 400, which can represent a lower portion of a 1000 count scale, using IR light emitted by an exemplary 850 nm LED results in the cyan ink 410 providing around a 135 count signal drop relative to the baseline transmission, which can be determined in some embodiments by transmission through the medium having no ink deposited thereon.

In comparison, the magenta ink 420 provides around a 20 count signal drop at 850 nm, while the yellow ink 430 provides around a 5 count drop. As a result, at around 850 nm, absorbance by the cyan ink 410 provides around a 115 count signal drop relative to the magenta ink 420 and around a 130 count signal drop relative to the yellow ink 430. The difference in absorbance between the ink colors can decrease as the wavelength of IR light increases, as shown in graph 400, until at around 940 nm the difference in absorbance between cyan ink 410, magenta ink 420, and yellow ink 430 can be negligible based upon a 1000 count scale.

The graph 400 of FIG. 4 illustrates the difference in IR absorbance between exemplary ink formulations that can be provided by a change in a range of IR wavelengths coming from an IR light source such as an LED. For instance, at around 880 nm in graph 400, a 15 nm change in either direction for an LED wavelength can provide around a 20 point change in either direction for a difference in absorbance between the cyan ink 410 and both the magenta ink 420 and the yellow ink 430. Such sensitivity to variations in wavelength can be taken into account when choosing an LED source of IR light and also when choosing an IR absorbent dye based upon peak absorbance wavelength and absorbance capability, which can be used to determine what concentration to use of the IR absorbent dye.

Figure 5:
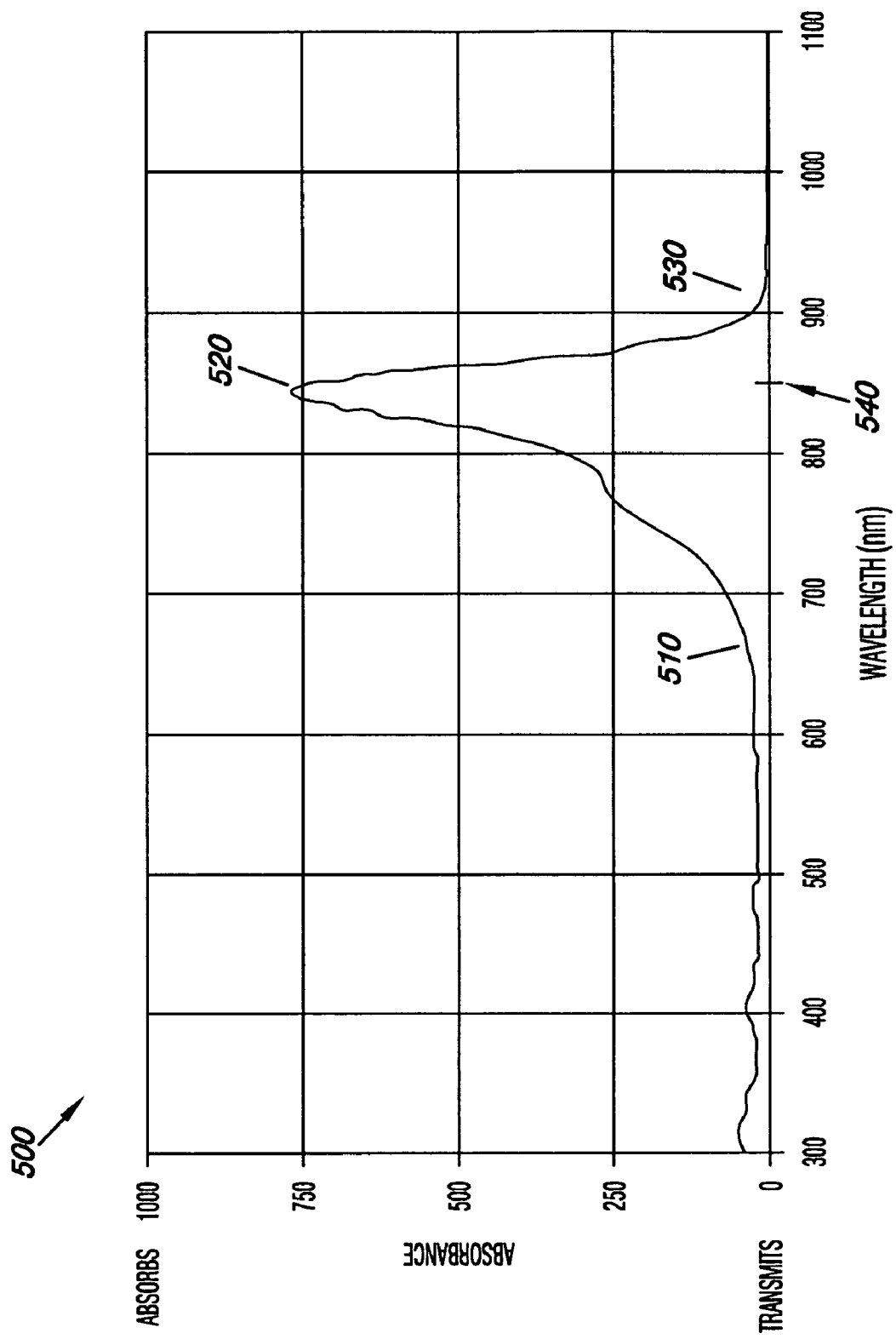
FIG. 5 illustrates a representation of spectral absorbance of an infrared absorbent dye according to an embodiment of the present disclosure.

FIG. 5 illustrates a representation of spectral absorbance of an IR absorbent dye according to an embodiment of the present disclosure. The graph 500 shown in FIG. 5 can illustrate on the vertical axis measurement of relative absorbance by ink and/or dye formulations across a spectrum of light wavelengths shown on the horizontal axis. In the particular example shown in graph 500, an absorbance profile of a particular IR absorbent dye is illustrated (i.e., an SDA4927 dye). The designation SDA4927 is a catalog number for a Near Infrared Dye/Absorber manufactured and marketed by the H. W. Sands Corporation located at 1080 E. Indiantown Road in Jupiter, Fla., USA, 33477. However, other types of suitable dyes and brands thereof can be utilized in various embodiments of the disclosure.

As shown in graph 500 of FIG. 5, when used in a formulation at a concentration of 0.04% by weight, drops of SDA4927 deposited on a medium provide little absorbance of wavelengths in the visible spectrum 510 below around 700 nm. At wavelengths in the far red portion of the visible spectrum and continuing into the near IR spectrum the absorbance capability, or absorptivity, of SDA4927 increases until it reaches a peak at 520, after which the absorptivity decreases once again to a low level at around a wavelength of 900 nm at 530. As identified in FIG. 10, the peak absorptivity wavelength for SDA4927 has been reported by the H. W. Sands Corp. to be 822 nm when mixed in methanol (MeOH) at 0.05% and the peak absorptivity wavelength has been measured at 835 nm when mixed in water ($H_2O$), which is around the peak wavelength at 540 shown in FIG. 5.

When the SDA4927 dye is used alone at a concentration of 0.04% (e.g., not mixed with a colored ink) SDA4927 can provide a signal drop of over 200 counts in an IR light intensity sensor having a 1000 count scale. As shown in graph 500, the SDA4927 dye has a wavelength absorbance range that is identifiable over an approximate 200 nm span (e.g., 700-900 nm). Moreover, the peak absorbance 520 is defined by a narrow peak having steep slopes that can be defined by an approximate 100 nm span (e.g., 800-900 nm) that is within the IR spectrum.

When the SDA4927 dye is used alone at a concentration of 0.04% or lower, the dye can be invisible when deposited on a medium. When the SDA4927 dye is used at a concentration of 0.04% or lower and mixed with colored inks (e.g., the exemplary cyan, magenta, and yellow inks previously described), the effect on the color can be detected by electronic sensors.

However, when examples of the colored inks with and without SDA4827 dye are examined side by side with the human eye, any color difference between the examples can be substantially imperceptible. Further, potentially perceptible color shifts that may be evident by adding SDA4927 dye at a concentration of 0.04% or lower are likely to be small and, thus, can be color mapped out of a printed image, as understood by those of ordinary skill in the art.

As such, the SDA4927 dye can be used as an IR absorbent dye for use in calibration of nozzles and/or ink pens in an inkjet printing device because the dye has desirable characteristics. For example, when used at concentrations that are substantially undetectable by the human eye when combined with colored inks, the SDA4927 dye can provide a greater than 200 count signal drop in transmission (e.g., a greater than 200 count signal rise in absorbance) of IR light in a wavelength span having a sharp peak, which can enable more accurate measurement of the signal drop by an sensor of IR light intensity.

Figure 6:
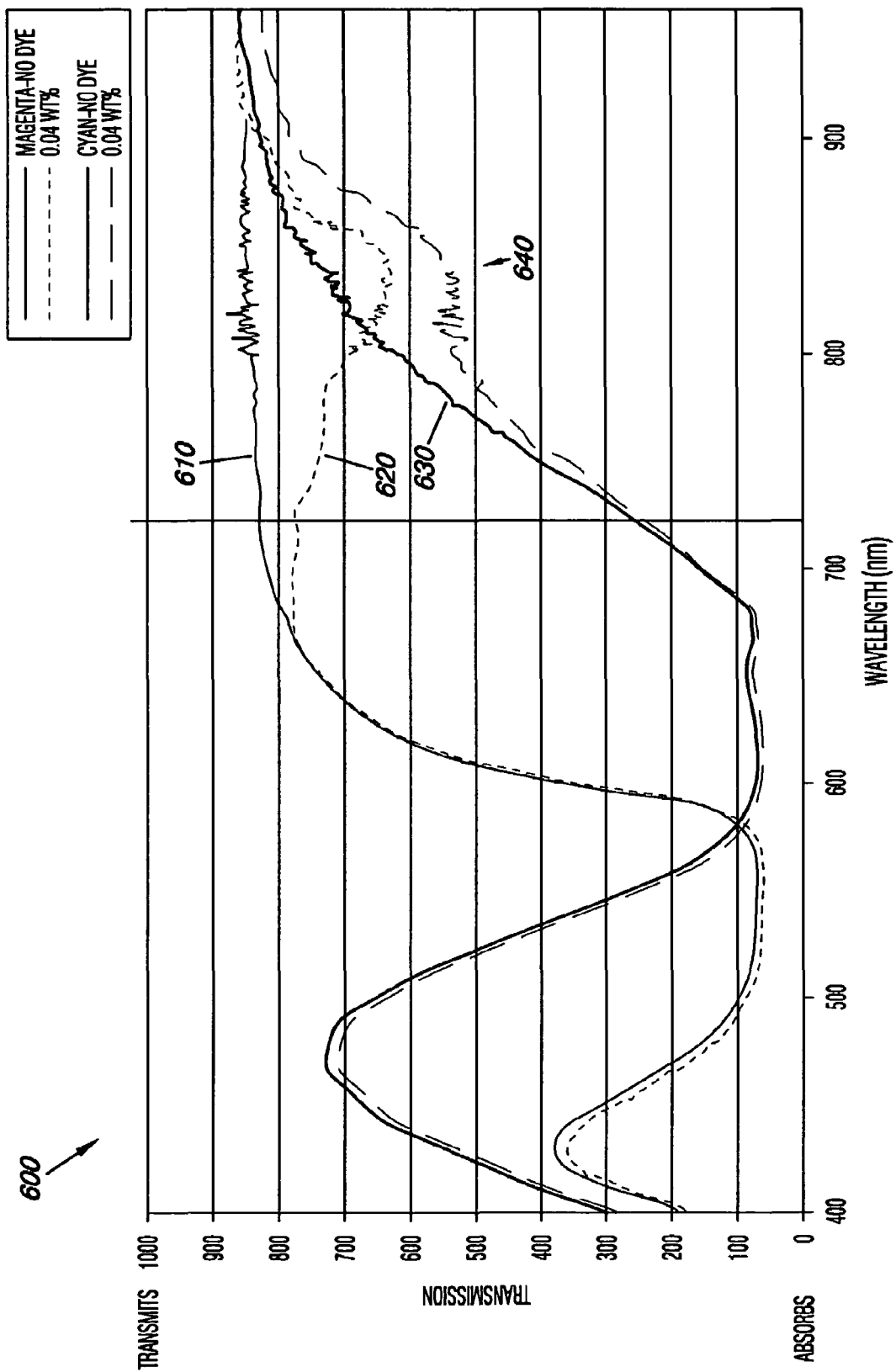
FIG. 6 illustrates a representation of spectral transmission resulting from combination of a first ink with an IR absorbent dye and a combination of a second ink with an infrared absorbent dye according to an embodiment of the present disclosure.

FIG. 6 illustrates a representation of spectral transmission resulting from combination of a first ink with an IR absorbent dye and a combination of a second ink with an IR absorbent dye according to an embodiment of the present disclosure. The graph 600 shown in FIG. 6 illustrates on the vertical axis measurement of relative transmission by a colored ink and/or a colored ink mixed with an IR absorbent dye across a spectrum of light wavelengths shown on the horizontal axis.

By way of example and not by way of limitation, graph 600 of FIG. 6 illustrates an exemplary magenta ink formulation and an exemplary cyan ink formulation that are each used with and without an added IR absorbent dye. In the example shown in graph 600, IR absorbent dye SDA4927 is used at a concentration of 0.04% when mixed with the magenta and cyan ink formulations measured for this example.

Graph 600 shows a light transmission profile 610 for a magenta ink formulation containing no SDA4927 absorbent dye. As shown by the transmission profile 610, the magenta ink formulation by itself effectively absorbs wavelengths in the middle of the visible spectrum with transmission increasing as the wavelengths lengthen toward the visible red.

In the invisible IR light wavelengths, the transmission profile 610 of the magenta ink formulation shows a relatively stable high level of transmission, which is approximately 870 on a scale of 0 to 1000 at a peak absorbance wavelength for the SDA4927 dye (e.g., 822 nm). When 0.04% by weight of the SDA4927 IR absorbent dye is added to the magenta ink formulation, the graph 600 illustrates a transmission profile 620 for the mixture showing that the SDA4927 IR absorbent dye can reduce the transmission of IR light at around 822 nm to approximately 620, which is approximately a 250 count signal drop in transmission, or a 250 count rise in absorbance of IR light at around 822 nm.

Graph 600 also shows a light transmission profile 630 for a cyan ink formulation containing no SDA4927 absorbent dye. As shown by the transmission profile 630, the cyan ink formulation by itself can have a high level transmission in the lower wavelengths of the visible spectrum and a low level of transmission (i.e., a high level of absorbance) in the upper wavelengths of the visible spectrum from yellow to red.

The cyan ink profile 630 shown in graph shows a transmission that increases as red wavelengths increase and continues to increase as wavelengths increase in the near IR spectrum. However, as described with regard to FIG. 2, near the visible light boundary the absorption of IR light remains high in the shorter wavelengths of the near IR spectrum, although the graph 600 of FIG. 6 shows that absorption of IR light in the cyan ink transmission profile 630 decreases as IR wavelengths increase.

As shown in graph 600, at around the 822 nm IR light wavelength, the transmission profile 630 for the cyan ink formulation by itself shows a transmission of approximately 725. When 0.04% by weight of the SDA4927 IR absorbent dye is added to the cyan ink formulation, the graph 600 illustrates a transmission profile 640 for the mixture showing that the SDA4927 IR absorbent dye can reduce the transmission of IR light at around 822 nm to approximately 450, which is approximately a 275 count signal drop in transmission, or a 275 count rise in absorbance of IR light at around 822 nm.

As shown in graph 600 of FIG. 6, the shape of the IR light transmission profile 620 for the mixture of the magenta ink formulation with the SDA4927 IR absorbent dye can be different from that of the transmission profile 610 of the magenta ink formulation by itself. That is, the transmission profile 620 for the mixture containing the SDA4927 absorbent dye can show a defined inverse peak with steeply sloping boundaries that can be distinguished from the relatively flat IR transmission profile 610 of the magenta ink formulation by itself.

As also shown in the graph 600, the 0.04% by weight concentration of the SDA4927 dye can have little effect throughout most of the visible light spectrum, as evidenced by comparing transmission profile for the mixture 620 with that of the magenta ink formulation by itself 610. Similar effects are shown in graph 600 by comparing the transmission profile 630 for the cyan ink formulation by itself with the transmission profile 640 of the mixture of cyan ink with the IR absorbent dye. As described above with regard to FIG. 5, the small reductions in transmission indicated in the far red visible portion of transmission profiles 620 and 640 are either unnoticeable by the human eye or can be color mapped out, in various embodiments.

Figure 7:
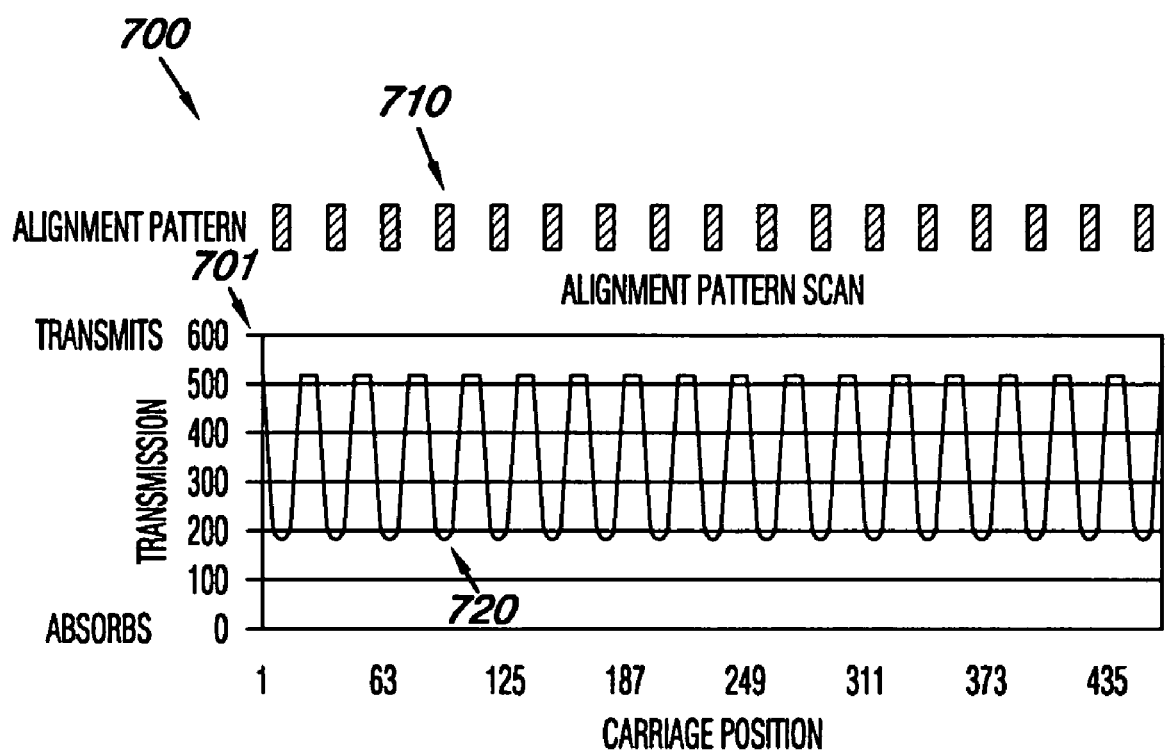
FIG. 7 illustrates a representation of transmission measured by scanning an alignment pattern printed with a first ink combined with an IR absorbent dye and a second ink combined with an infrared absorbent dye according to an embodiment of the present disclosure.

FIG. 7 illustrates a representation of transmission measured by scanning an alignment pattern printed with a first ink combined with an IR absorbent dye and a second ink combined with an IR absorbent dye according to an embodiment of the present disclosure. An alignment pattern 700 shown at the top of FIG. 7 can be printed on medium by a first ink pen and/or nozzle having alignment tested relative to a second ink pen and/or nozzle. In FIG. 7, a graph 701 of an alignment pattern scan is shown below the alignment pattern that can represent counts detected by an IR intensity sensor.

The graph 701 of the alignment pattern scan, as illustrated in FIG. 7, is represented by a horizontal axis that can correlate a carriage position of a mobile carriage, traversing ink pens and/or nozzles across the medium, with a particular location in the alignment pattern 700 printed by the ink pens and/or nozzles. A vertical axis of the alignment pattern scan graph 701 can show an intensity of IR light transmission, detected by the IR intensity sensor, passing through positions of the alignment pattern 700 printed by the first and second ink pens and/or nozzles that correlate with the carriage position.

In the example of FIG. 7, a portion of a 1000 count scale is shown on the vertical axis wherein the zero value indicates maximum detectable absorbance of IR light by a position in the printed alignment pattern 700 and a value of 600 indicates a high level of IR light transmission through a position in the printed alignment pattern 700. Peaks in transmission in the alignment pattern scan 701 representing transmission through the alignment pattern 700, as shown in FIG. 7, are truncated at a transmission count around 510.

The peaks in the alignment pattern scan graph 701 can represent spacing between segments of a pattern (e.g., rectangles) printed by ink pens and/or nozzles being tested for relative alignment. When the medium has had little or no ink containing an IR absorbent dye deposited thereon, an IR intensity sensor can detect a high level of IR light transmission. Conversely, when a position of the medium having ink containing an IR absorbent dye deposited thereon is measured with the IR intensity sensor, a low level of transmission corresponding to a high level of absorbance can be detected.

For example, pattern element 710 of the alignment pattern 700 can be printed with a colored ink containing an IR absorbent dye, as illustrated in FIG. 6, that confers an elevated absorptivity to the colored ink at an IR wavelength emitted from an IR light source (e.g., an IR-emitting LED). A level of decreased IR transmission (i.e., increased IR absorbance) for the alignment pattern element 710 is shown in the alignment pattern scan 701 as a low level trough at 720 in the transmission.

As shown in FIG. 7, the location, as determined by carriage position, and intensity of IR light transmission, as determined by the IR light intensity sensor, can be measured by scanning the alignment pattern 700. In some embodiments, this data can be converted through the use of executable instructions (e.g., logic) to provide a graphic representation in the alignment pattern scan 701.

When an equivalent concentration of IR absorbent dye is included in each ink formulation used for the first ink pen and/or nozzle having alignment compared relative to the second ink pen and/or nozzle, the rectangles in the alignment pattern printed by the first and second ink pens and/or nozzles can have an IR transmission intensity that differs little from one rectangle to another, as shown in the alignment pattern scan 701 of FIG. 7. As such, one principal variable of an alignment pattern scan, as shown by scan 701 of FIG. 7, can be a separation distance between troughs (e.g., position 720) corresponding to printed portions of the alignment pattern (e.g., rectangle 710).

Because the distance between positions on an alignment pattern scan can be correlated with a carriage position of the carriage traversing the medium, the distances can be used to determine alignment of ink drops being ejected by a first ink pen and/or nozzle onto the medium relative to ink drops being ejected by a second ink pen and/or nozzle onto the medium. For example, when a desired separation distance instruction has been entered for portions of an alignment pattern (e.g., rectangles) the desired separation distance can be used for alignment by determining a discrepancy in the separation distance(s) between transmission troughs (e.g., trough at 720 and others of alignment pattern scan 701 of FIG. 7). A signal drop of, for example, 200 counts can assist in distinguishing a signal drop from noise, and consequently assist in accurately determining distance of separation of one transmission trough from another (e.g., as shown in the alignment scan 701 of FIG. 7).

In some embodiments of the present disclosure, an alignment pattern can include a series of pattern elements (e.g., rectangles as shown in alignment pattern 700). In various embodiments, the alignment pattern can be printed using a first and a second nozzle of the same ink pen for purposes of comparing the relative alignment of the first nozzle with the second nozzle, and/or the alignment pattern can be printed using one or more nozzles of a first ink pen for purposes of comparing the alignment relative to one or more nozzles of the second ink pen.

In some embodiments, the first ink pen and the second ink pen can use different color ink formulations (e.g., magenta and cyan) as shown in FIG. 6. In various embodiments, different ink color formulations can be mixed with the same concentration of an IR absorbent dye, as shown in FIG. 6, or a different concentration of IR absorbent dye, which can be selected to provide an equivalent level of signal drop for the different colors (e.g., as shown for the lowest transmission count levels for the troughs in alignment pattern scan 701 of FIG. 7).

By way of example and not by way of limitation, an alignment pattern 700 as shown in FIG. 7 can be printed whereby some rectangles (e.g., odd-numbered) are printed using a first ink pen and/or nozzle and alternating (e.g., even-numbered) rectangles are printed using a second ink pen and/or nozzle. In some embodiments, the odd-numbered rectangles can be printed by a first ink pen and/or nozzle from left to right and the even-numbered rectangles can be printed by a second ink pen and/or nozzle from right to left to print a bi-directional alignment pattern.

The IR intensity sensor can scan the bi-directional alignment pattern and, in some embodiments, the processor can compare the separation distance of the alternating individual printed rectangles to determine alignment of the respective first and second ink pens and/or nozzles. In some embodiments, the processor can combine position measurements of one group of alternating rectangles (e.g., odd-numbered rectangles) and compare the measurement to a combined position measurement of another group of alternating rectangles (e.g., the even-numbered rectangles) to determine alignment of the respective first and second ink pens and/or nozzles.

In various embodiments, the first ink pen and/or nozzle uses an ink color formulation (e.g., magenta) that is different from an ink color formulation used by the second ink pen and/or nozzle (e.g., cyan) utilized in a printing device using multiple ink color formulations (e.g., CMYK). In some embodiments, the alignment of each ink pen and/or nozzle having a particular color formulation can be determined relative to every other, or a subset thereof, ink pen and/or nozzle having a different color ink formulation.

In some embodiments, ink pens and/or nozzles each having different ink formulations can have alignment determined relative to an ink pen and/or nozzle having a single ink color formulation. For instance, an ink pen using a cyan ink formulation, an ink pen using a magenta ink formulation, and an ink pen using a yellow ink formulation, each containing an IR absorbent dye, can all have their alignment determined relative to a single ink pen using a black ink formulation, which can, due to the IR light absorption characteristics of black ink, either contain an IR absorbent dye or not, in various embodiments. In some embodiments, executable instructions can analyze IR light intensity measurements to enable adjustment of timing of ink drop ejection to calibrate for misalignment of at least one ink pen and/or nozzle.

In some embodiments, alignment of ink pens and/or nozzles can be performed using interference in a pattern printed with an ink formulation containing an IR absorbent dye. To create an interference pattern in such embodiments, a series of blocks (e.g., rectangles), for example, can be printed across the medium.

In some embodiments, each block can include a first set of lines (e.g., vertical or horizontal) of one color coming from a first ink pen and/or nozzle at the same frequency (e.g., one line spaced every 10/600ths of an inch). Each block also can have a second set of lines created using either the same color or a different color coming from a second ink pen and/or nozzle.

The second set of lines can be physically spaced at a different location relative to the first set of lines. For example, for the first block, the second set of lines can be offset from the first by 3/600ths of an inch, the second block can be offset by 2/600ths, the third block can be offset by 1/600th, the fourth block by 0/600ths, the fifth block by −1/600th, and so forth.

In such embodiments, the IR intensity sensor can be passed over the series of blocks to determine which block has the highest signal drop by measuring transmission. The block having the highest signal drop will typically have the first set of lines on top of the second set of lines. From such analysis, alignment of the first ink pen and/or nozzle relative to the second ink pen and/or nozzle can be determined, for example through executable instructions.

Differences in drop weight between a first ink pen and/or nozzle and a second ink pen and/or nozzle ejecting the same and/or different color ink formulations can provide different relative quantities of ink in a single drop that is deposited on a medium. Having a quantity of ink colorant in an ink drop that is different from an intended quantity can result in an unintended difference in color between one ink pen and/or nozzle and another ink pen and/or nozzle, especially if the drop weight difference is consistent. A consistently different drop weight being ejected from the first ink pen and/or nozzle, for example, relative to a drop weight being ejected from another ink pen and/or nozzle can result in an unintended color shift in halftone images rendered using a combination of the colors from the ink pens and/or nozzles.

In some embodiments, variations in drop weight can be correlated with variations in drop volume, and variations in drop volume can be correlated with variations in amounts of ink colorant and IR absorbent dye contained therein. As previously described herein, variations in amounts of IR absorbent dye deposited on a medium can be correlated with absorption of IR light and consequent signal drop in transmission detected by an IR light intensity sensor.

Accordingly, a difference in drop weight being ejected from a first ink pen and/or nozzle related to a second ink pen and/or nozzle can be correlated with a difference in transmission signal drop count detected by an IR intensity sensor. That is, for example, a difference in magnitude of transmission signal drop provided by equal numbers of drops containing equivalent concentrations of an IR absorbent dye deposited on a medium by a first ink pen and/or nozzle relative to a second ink pen and/or nozzle can be proportional with a difference in drop weight between the two ink pens and/or nozzles.

Determining a relative drop weight difference between drops ejected from a first ink pen and/or nozzle using a first ink color formulation and a second ink pen and/or nozzle using a second ink color formulation can be accomplished by mixing an equivalent concentration of IR absorbent dye into both ink color formulations. An equivalent concentration of IR absorbent dye can operate so as to provide a signal drop for transmission of IR light through a particular volume of the first ink color formulation deposited on a medium that is equal to a signal drop level achieved by depositing the same volume of the second ink color formulation on the medium, as shown in FIG. 7.

Figure 8:
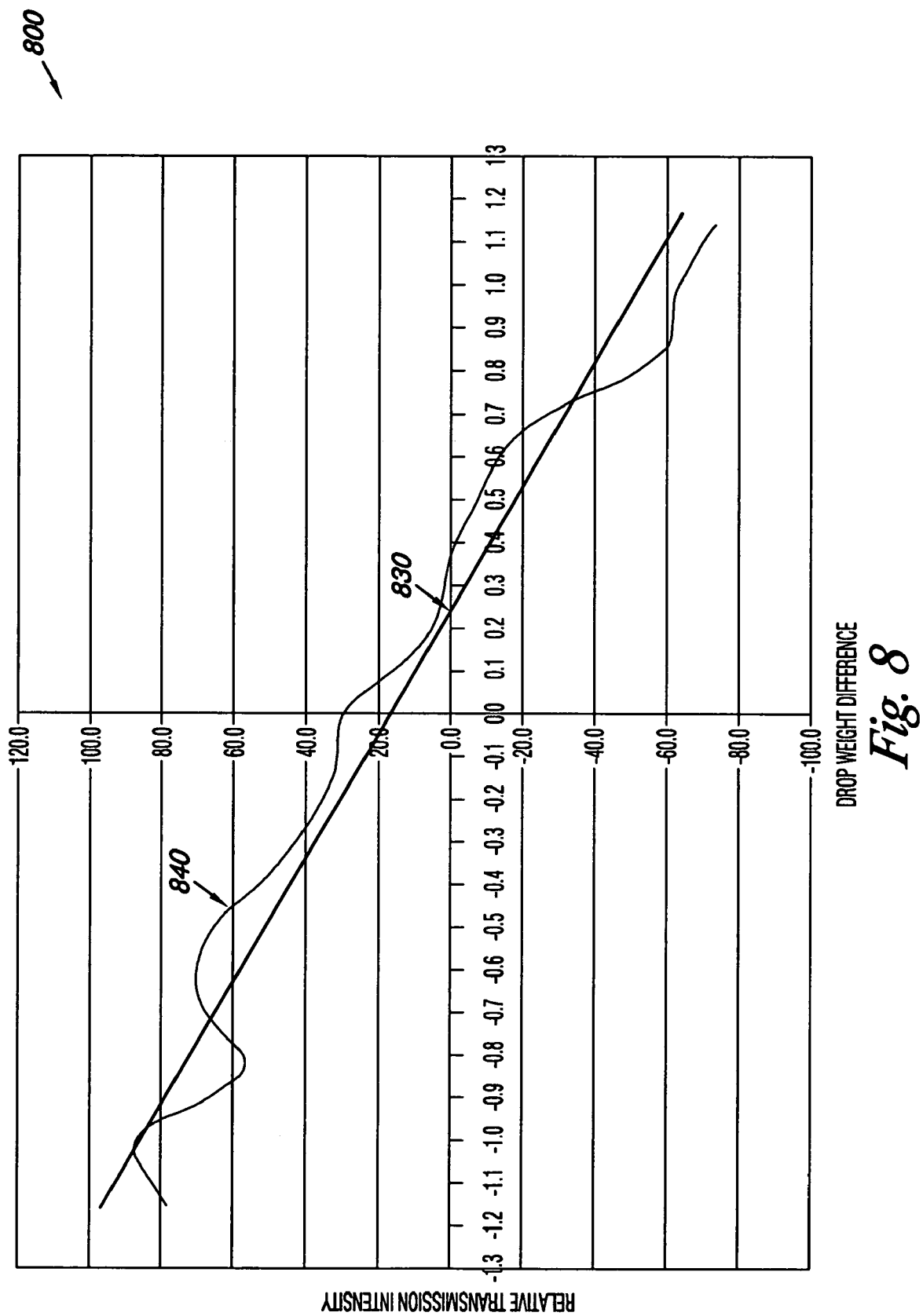
FIG. 8 illustrates a graph representing a correlation that can assist in determining relative drop weight difference according to an embodiment of the present disclosure.

FIG. 8 illustrates a graph 800 representing a correlation that can assist in determining relative drop weight difference according to an embodiment of the present disclosure. On the vertical axis, the graph 800 illustrates measurements of relative transmission of IR light through a variably halftoned print pattern, as described in further detail below. Such a print pattern can be printed using a single ink color formulation that can contain a uniform concentration of IR absorbent dye or using multiple different ink color formulations that can contain an equivalent concentration of IR absorbent dye, as described above. On the horizontal axis, the graph 800 illustrates a relative difference in drop weight of ink drops ejected from a first ink pen and/or nozzle relative to ink drops ejected from a second ink pen and/or nozzle.

Determining relative drop weight differences between a first and a second ink pen and/or nozzle can enable calibration of ink pens and/or nozzles by executable instructions that can adjust numbers of ink drops ejected by the first ink pen and/or nozzle relative to numbers of ink drops ejected, for example, by the second pen and/or nozzle to achieve an intended balance of IR transmission intensity between the various ink pens and/or nozzles. In some embodiments, achieving an intended balance of IR transmission intensity using an IR absorbent dye for calibration of relative drop weight difference can assist in achieving an intended balance in color intensity on the medium upon which ink drops with relative ink drop differences have been deposited.

By way of example and not by way of limitation, a print pattern (e.g., having a number of pattern elements such as rectangles or other shapes or symbols) can be printed to determine a drop weight difference between a first and a second ink pen using different ink color formulations. For example, the first ink pen can use yellow ink and the second ink pen can use magenta ink.

As described with regard to FIG. 7, an ink pattern can have rectangles that can be printed using alternating colors (e.g., yellow and magenta in this example). In such an embodiment, the rectangles printed using one of the two ink pens (e.g., yellow from the first ink pen) can be printed using a constant halftone pattern percentage (e.g., 75%) and the ink drops from the first ink pen each can contain a constant weight of the IR absorbent dye that as a result provides a constant weight of the IR absorbent dye to be deposited in each rectangle (e.g., 5.00 ng).

The alternating rectangles can be printed using the color of the second ink pen (e.g., magenta) and can be printed using a varying halftone pattern percentage. For example, executable instructions (e.g., executed by a processor or other circuit) can be used to increment or decrement the percentage (e.g., from 25% to 100%), which can provide corresponding variance in numbers of ink drops deposited in each alternating rectangle and which in turn can provide a corresponding increase in the weight of the IR absorbent dye deposited in each alternating rectangle.

When the drop weight ejected by the first ink pen is the same as that ejected by the second ink pen, the weight of the IR absorbent dye deposited in each alternating rectangle printed by the second pen can be determined by a ratio of the rectangle's halftone pattern percentage to that of the first ink pen (e.g., 75%). As such, when the drop weights are the same, the weight of IR absorbent dye deposited in each alternating rectangle can range, for example, from 1.67 ng to 6.67 ng.

Constructing a graph, such as graph 800 of FIG. 8, on which the IR light transmission of the yellow rectangles having a constant IR absorbent dye weight relative to IR light transmission of magenta rectangles having varying IR absorbent dye weight is plotted versus a difference in the drop weight of the IR absorbent dye deposited in the yellow rectangles compared to the magenta rectangles can yield a straight line that intercepts the axes at the origin, that is, at 0.0 on the vertical axis and 0.0 on the horizontal axis. However, when the drop weights being ejected from the first and second ink pens differ, a straight line constructed as just described can intercept the axes at differing locations. The intercept on the horizontal axis can indicate a relative difference in drop weight of the first ink pen relative to the second ink pen.

In the exemplary graph 800 shown in FIG. 8, a yellow ink is printed at a 75% halftone pattern and a magenta ink is varied from 50% to 100%. A scan using the IR intensity sensor is made across the pattern to compare pairs of yellow and magenta rectangles. The graph 800 shows the relative difference between the yellow and magenta signals.

The example illustrated in graph 800 shows a linear regression line intercepting the horizontal axis at a point 830, the linear regression being obtained from a plot 840 of the actual relative transmission intensity values. The regression intercept point 830 can indicate that the magenta ink drops are each around 0.25 picoliters (pl) heavier than the yellow ink drops. To calibrate for such a difference, assuming that the yellow ink drops are each 1.0 pl, the executable instructions can, for example, instruct the yellow ink pen and/or nozzle to eject five ink drops for every four ink drops ejected by the magenta ink pen.

Analysis of IR absorbent dye absorbance of IR light transmission can be used to calibrate for a relative drop weight difference of a first ink pen intended to have a high drop weight relative and a second ink pen intended to have a low drop weight, which can be used to reduce graininess in particular situations (e.g., in images containing skin tones). In addition, analysis of IR absorbent dye absorbance of IR light transmission can be used to calibrate for a relative dye load difference between different ink pens, whether such a difference is unintended (e.g., in ink pens intended to have the same load of colorant in their ink formulation) or intended (e.g., for ink pens having high and low ink loads to reduce graininess in particular situations).

Such determination of differences between a first ink pen relative to a second ink pen can be accomplished through use of data such as that provided in graph 800 of FIG. 8. Similarly, calibration of the first and second ink pens can be achieved by executable instructions varying the number of ink drops ejected from the first ink pen relative to the number of ink drops ejected from the second ink pen.

Figures 9, 10:
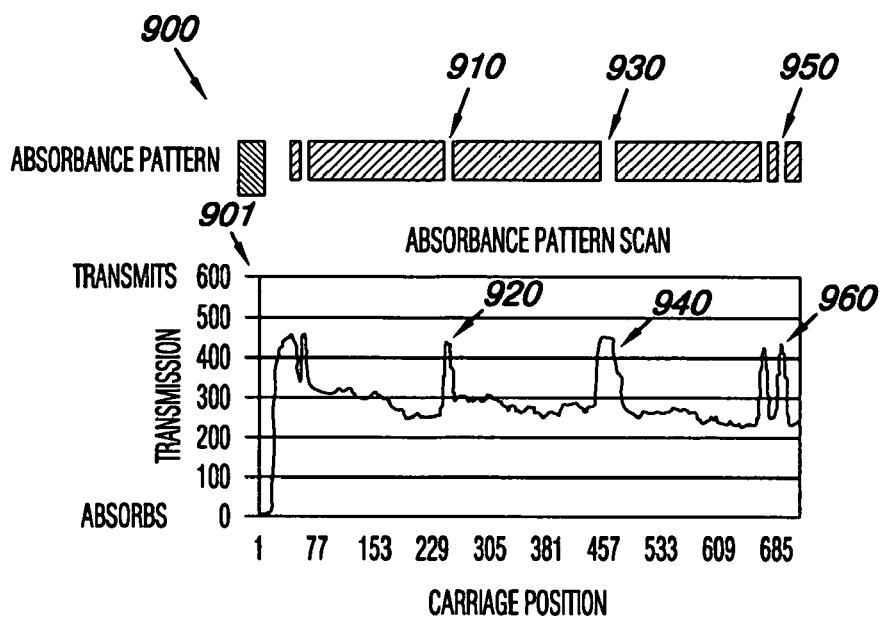
FIG. 9 illustrates a representation of transmission measured by scanning a pattern printed by multiple nozzles of an ink pen to detect absence of an infrared absorbent dye according to an embodiment of the present disclosure.
FIG. 10 illustrates a table representing absorbance characteristics of various infrared absorbent dyes according to an embodiment of the present disclosure.

FIG. 9 illustrates a representation of transmission measured by scanning a pattern printed by multiple nozzles of an ink pen to detect absence of an IR absorbent dye according to an embodiment of the present disclosure. An absorbance pattern 900, shown at the top of FIG. 9, can be printed on a medium by an ink pen having multiple nozzles. In FIG. 9, a graph 901 of an absorbance pattern scan is shown below the alignment pattern that can, for example, represent counts detected by an IR intensity sensor.

The graph 901 of the absorbance pattern scan, as illustrated in FIG. 9, is represented by a horizontal axis that can correlate a carriage position of a carriage that can traverse an ink pen, having multiple nozzles, across the medium with a particular location in the absorbance pattern 900 printed by the multiple nozzles. A vertical axis of the absorbance pattern scan graph 901 can show an intensity of IR light transmission, detected by the IR intensity sensor, passing through positions of the absorbance pattern 900 printed by the multiple nozzles that correlate with the carriage position.

A portion of a 1000 count scale is shown on the vertical axis wherein the zero value indicates a maximum detectable absorbance of IR light, in the example of FIG. 9, by a position in the printed absorbance pattern 900. On the scale of the example of FIG. 9, a value of 600 indicates a high level of IR light transmission through a position in the printed absorbance pattern 900.

In the embodiment of FIG. 9, the peaks in the absorbance pattern scan graph 901 represent absence of ink deposited on the medium by ejection from nozzles being tested. When the medium has had little or no ink containing an IR absorbent dye deposited thereon, an IR intensity sensor can detect a high level of IR light transmission.

Conversely, in the embodiment of FIG. 9, when a position of the medium having ink containing an IR absorbent dye deposited thereon is measured with the IR intensity sensor, a low level of transmission corresponding to a high level of absorbance is detected. For example, the absorbance pattern 900 has a gap at position 910 where little or no IR absorbent dye has been deposited by ejection of ink drops from an ink nozzle.

A corresponding peak 920 in transmission intensity appears in the absorbance pattern scan graph 901. In various embodiments, this information can be used to identify a location of a particular nozzle not ejecting IR absorbent dye based upon the carriage position shown on the horizontal axis.

In some embodiments, the width of a gap in the absorbance pattern 900 can represent a number of nozzles not ejecting the IR absorbent dye. The width of the gap in the absorbance pattern 900 can determine the width of a peak illustrated in the absorbance pattern scan graph 901, which also can represent the number of nozzles not ejecting the IR absorbent dye.

For example, gap 910 and the corresponding peak 920 each can be narrow enough to result from absence of IR absorbent dye ejection from a single nozzle located near carriage position 229. Being wider than the gap 910, a gap 930 in the absorbance pattern 900 corresponding to a wider peak 940 in the absorbance pattern scan graph 901 can result from absence of IR absorbent dye ejection from multiple adjacent nozzles located near carriage position 457.

Two gaps 950 separated by a narrow printed portion in the absorbance pattern 900 can correspond to two narrowly separated peaks 960 in the absorbance pattern scan graph 901 that can indicate two nozzles not ejecting IR absorbent dye located near carriage position 685 that are separated by a nozzle that does eject IR absorbent dye. Not ejecting IR absorbent dye can indicate failure to eject drops of a colored ink formulation onto the medium. Based on the carriage position of the nozzles that are not ejecting IR absorbent dye and ink onto the medium, executable instructions can adjust timing of ink drop ejection from a substitute ink pen and/or nozzle, to fill in for the particular nozzle that is not ejecting ink.

FIG. 10 illustrates a table representing absorbance characteristics of various IR absorbent dyes according to an embodiment of the present disclosure. The table 1000 shown in FIG. 10 provides values for a number of Near Infrared Dye/Absorber compounds manufactured and marketed by the H. W. Sands Corporation that can be used as IR absorbent dyes in various embodiments of the present disclosure.

For each dye, a value is provided in table 1000 for a maximum absorbance wavelength ($\lambda_{max}$) measured in 0.05% MeOH, as reported by the H. W. Sands Corp., a $\lambda_{max}$ measured in $H_2O$, and a measured extinction coefficient ($\epsilon$) representing the absorptivity of the dye expressed as liters per gram times centimeters (L/gm-cm). Absorptivity can represent an amount of incident light absorbed by a substance in solution (e.g., water or other suitable solution) at a particular wavelength, which is a constant characteristic of the substance. An absorptivity value for a substance that is higher than the absorptivity value for another substance can indicate a higher capacity for absorbing incident light.

Several suitable dyes are provided in table 1000 of FIG. 10. These exemplary dyes can be usable as IR absorbent dyes and have a maximum wavelength range from a $\lambda_{max}$ in $H_2O$ of about 835 nm for SDA4927 to about 920 nm for SDA8737. Absorptivity for SDA4927 is around 270, which represents a higher capacity per gram for absorbing incident light than SDA8737, which has an absorptivity of around 18 when mixed in a dye carrier at a 0.05% by weight concentration.

Figure 11:
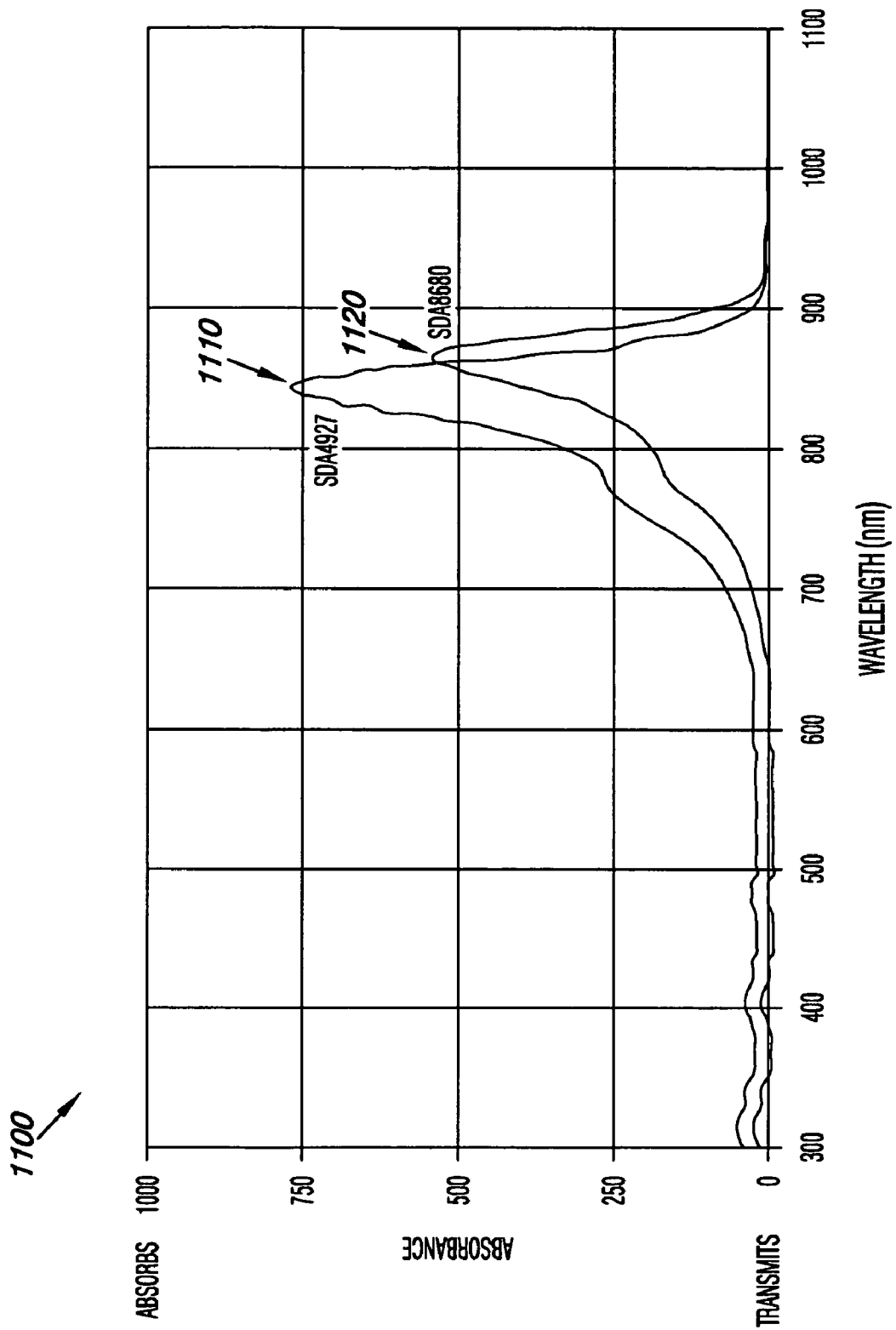
FIG. 11 illustrates a representation of spectral absorbance of a first and a second infrared absorbent dye according to an embodiment of the present disclosure.

FIG. 11 illustrates a representation of spectral absorbance of a first and a second IR absorbent dye according to an embodiment of the present disclosure. The graph 1100 shown in FIG. 11 can illustrate, on the vertical axis, measurement of relative absorbance by dye formulations across a spectrum of light wavelengths shown on the horizontal axis. In the particular example shown in graph 1100, an absorbance profile of a first IR absorbent dye is illustrated (e.g., the SDA4927 dye) as compared to an absorbance profile of a second IR absorbent dye (e.g., SDA8680).

As shown in graph 1100 of FIG. 11, when used in a dye carrier formulation at a concentration of 0.04% by weight, drops of SDA4927 deposited on a medium have a peak absorbance 1110 around 835 nm that results in absorption of around 755 counts on a 1000 count scale. In comparison, SDA8680 used at the same concentration has a peak absorbance 1120 around 880 nm that results in absorption of around 550 counts. Comparison of the difference in absorption counts at the peak wavelength for each dye is consistent with comparison of the absorptivity values in table 1000 of FIG. 10.

Figure 12:
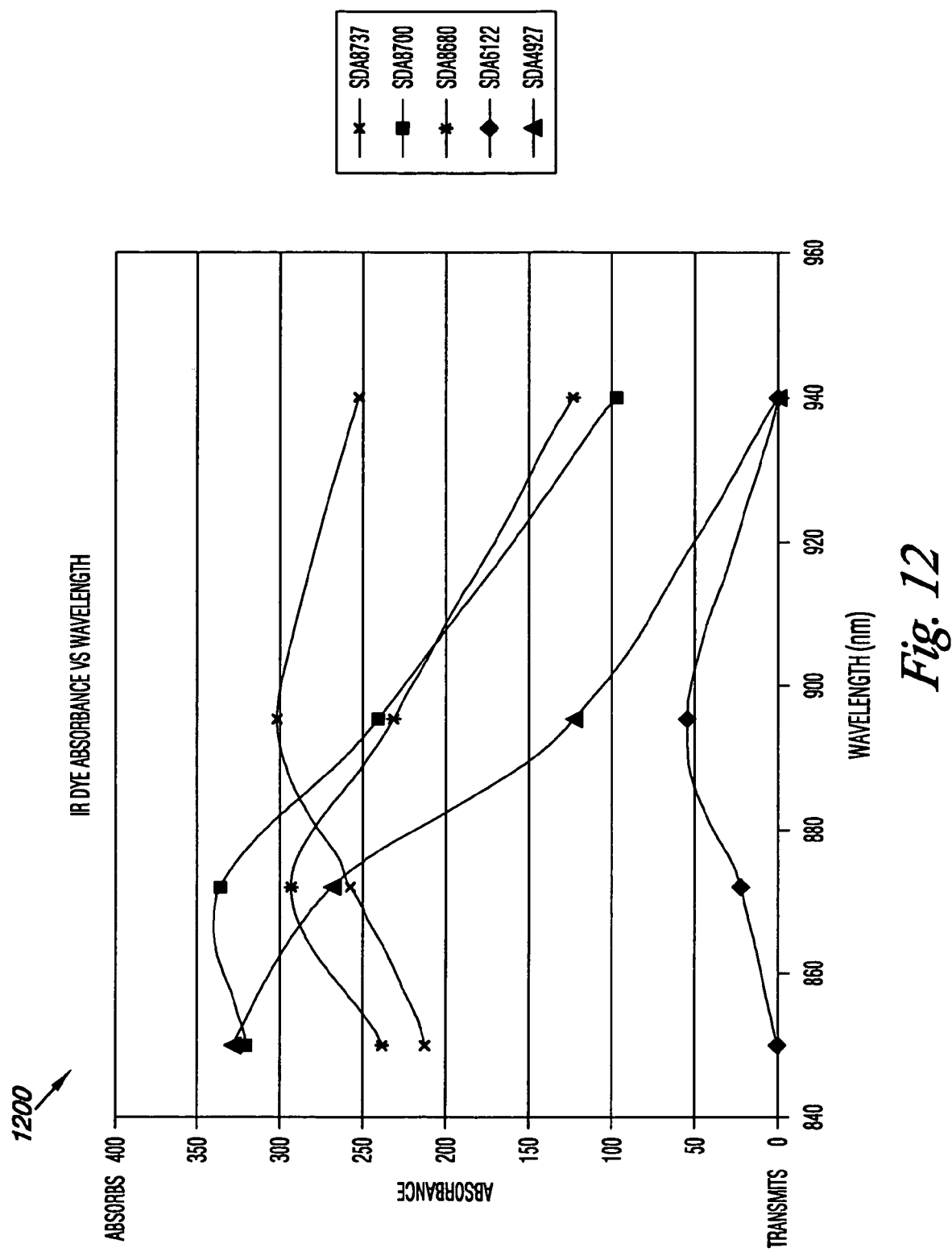
FIG. 12 illustrates a representation of absorbance of infrared light from 850 nm to 940 nm by various infrared absorbent dyes according to an embodiment of the present disclosure.

FIG. 12 illustrates a representation of absorbance of IR light from 850 nm to 940 nm by various IR absorbent dyes according to an embodiment of the present disclosure. The graph 1200 shown in FIG. 12 illustrates, on the vertical axis, measurement of relative IR light absorbance, on a lower portion of a 1000 count scale, provided by the IR absorbent dye formulations shown in table 1000 of FIG. 10 across a range of IR light wavelengths shown on the horizontal axis.

Absorbance profiles for IR light ranging from around 850 nm to around 940 nm are shown for the IR absorbent dyes mixed at a 0.05% by weight concentration in a dye carrier not containing an ink colorant. Absorbance of IR light by an IR absorbent dye is shown in comparison to absorbance by the dye carrier alone. Thus, for example, at an IR wavelength of around 850 nm, SDA4927 can provide a signal drop of around 320 counts.

As shown in graph 1200 of FIG. 12, LEDs emitting IR light at particular wavelengths can have an identifiable effect on absorbance, or signal drop, conferred by the same concentration by weight of various IR absorbent dyes. In addition, the relative absorptivity of various IR absorbent dyes can vary at different IR wavelengths.

For example, whereas SDA4927 can provide the highest signal drop at around 850 nm, it can have very low absorptivity at around 940 nm, which can make it nearly equal to the least absorptive marker (i.e., SDA6122) throughout the IR wavelength range. At a wavelength of around 872 nm, SDA8700 can have the highest absorptivity, and SDA4927 can decline to third highest of the five IR absorbent dyes at that wavelength.

Similarly, at around 880 nm, SDA8737 can have the highest absorptivity, and SDA4927 can decline to fourth highest. At 940 nm, SDA8737 can remain the highest IR absorbent dye in absorptivity, while, as previously stated, SDA4927 can decline to a lowest level of absorptivity. The SDA8680 dye does not have the highest or the lowest absorptivity at the IR wavelengths illustrated.

In some embodiments, it is desirable to have a signal drop of at least 200 counts at a particular wavelength when using an IR absorbent dye in order to have an effect that can be clearly distinguished from noise (e.g., see FIG. 6). Accordingly, IR absorbent dyes SDA4927, SDA8680, SDA8700, and SDA8737 can be used with LEDs emitting 850 nm and 872 nm.

Based on at least a 200 count drop, SDA4927 may not be best suited to be used with an 880 nm LED, although IR absorbent dyes SDA8680, SDA8700, and SDA8737 would be suitable. When using a 940 nm LED, the SDA8737 dye is shown to provide at least a 200 count signal drop. The SDA6122 dye is not shown to provide at least a 200 count signal drop at the wavelengths illustrated.

As described above, colorants in ink formulations generally have a limited ability to absorb IR light wavelengths. As such, in various embodiments of the present disclosure, the distinguishable absorbance characteristics of IR absorbent dyes, such as those described above, can provide a "fingerprint" during analysis of ink formulations through measurement of absorbance of various IR wavelengths.

In some embodiments, a logic component in a printing device, therefore, can analyze IR light intensity measurements to enable detection of a counterfeit ink formulated from a mixture lacking the particular IR light absorbent dye. Detection of a counterfeit dye formulation can, in some embodiments, result in an operator of the printing device being informed about the counterfeit ink, which can result from purchase of a counterfeit or an unauthorized refilled ink cartridge.

In various embodiments, an apparatus for printing can include a print medium advancement mechanism, at least two ink pens for ejecting ink drops onto the print medium, wherein each ink pen includes an equivalent concentration of a particular IR light absorbent dye in a mixture with an ink, an IR light source to illuminate a location on the print medium where ink containing the IR absorbent dye can be deposited, a sensor of IR light intensity to measure absorbance of IR light, and a logic component to analyze IR light intensity measurements obtained from sensing ink deposited on a surface of the print medium.

Some embodiments of the printing device can use the logic component to analyze IR light intensity measurements to enable adjustment of timing of ink drop ejection to calibrate for misalignment of at least one ink pen. Some embodiments can use the logic component to analyze IR light intensity measurements to enable adjustment of timing of ink drop ejection to calibrate for a particular nozzle that is not ejecting ink. In various embodiments, the logic component can analyze IR light intensity measurements to enable adjustment of numbers of ink drops ejected to calibrate for a relative drop weight difference of one ink color to another ink color, a relative drop weight difference of a high and a low drop weight ink pen, and/or a relative dye load difference between different ink pens.

Figure 13:
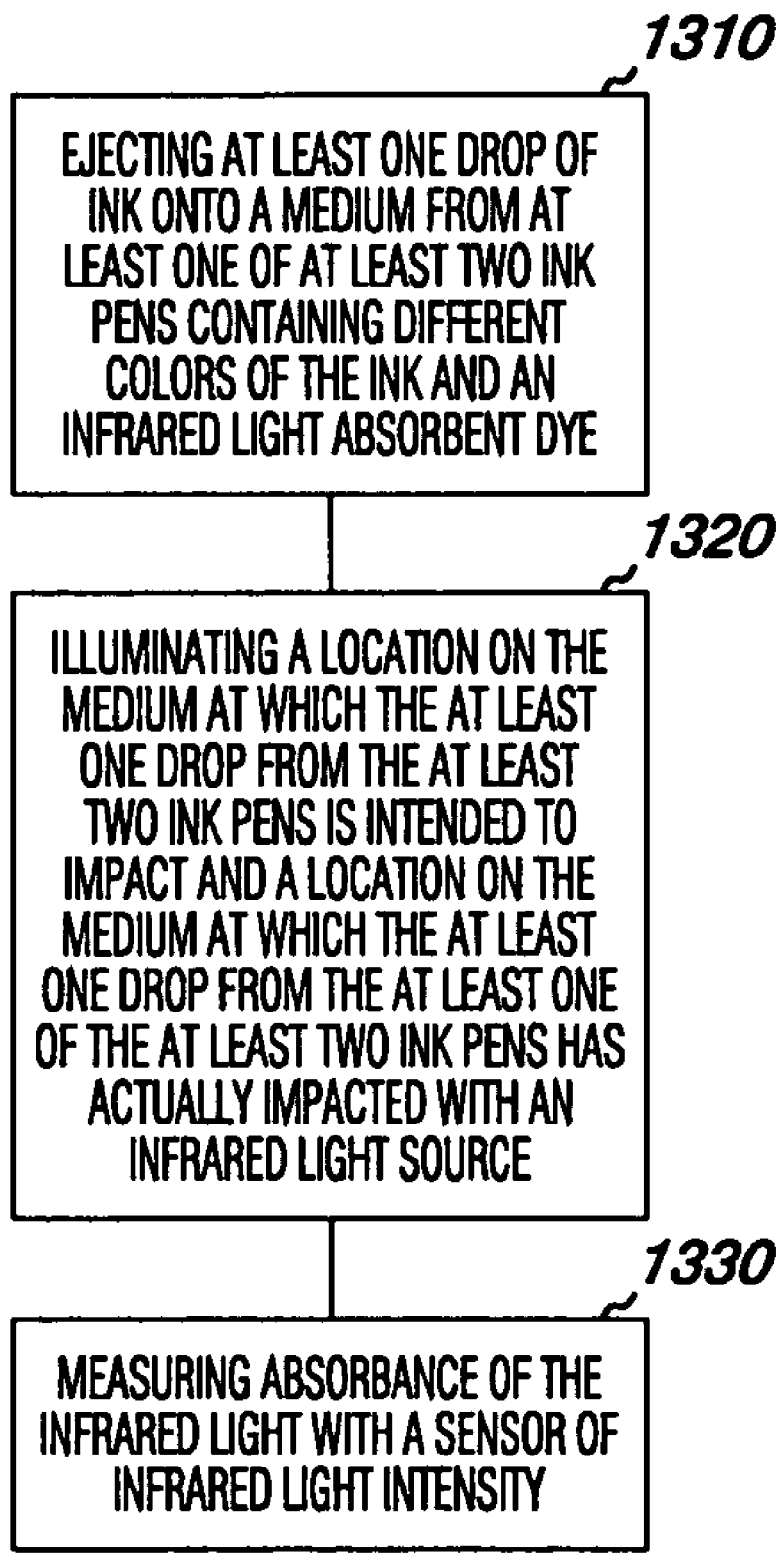
FIG. 13 is a block diagram illustrating a method for utilizing an infrared absorbent dye according to an embodiment of the present disclosure.

FIG. 13 is a block diagram illustrating a method for utilizing an IR absorbent dye according to the present disclosure. The embodiment illustrated in FIG. 13 includes ejecting at least one drop of ink onto a medium from at least one of at least two ink pens containing different colors of the ink and an IR light absorbent dye, as shown in block 1310.

The IR light absorbent dye can be used at a concentration in the ink high enough to absorb enough of the incident light to provide an identifiable drop in the signal intensity detected by a sensor of IR light intensity (e.g., a signal drop of at least 20% compared to the ink without the IR absorbent dye) while being used at a concentration low enough so as to retain a signal intensity in a range that can be detected by the sensor. Depending upon an ink formulation with which an IR absorbent dye is combined, which can be influenced by an ink dye color, an IR absorbent dye can often be used, for example, in a range from about 0.01% by weight to about 0.10% by weight, which are provided by way of example and not by way of limitation. For instance, using SDA4927 at a 0.025% by weight concentration in a magenta ink formulation can result in, for example, around a 25% signal drop, while to obtain a similar percentage signal drop with a cyan ink formulation, which can have a notable inherent absorption of wavelengths up to around 900 nm, an SDA4927 concentration of around 0.040% by weight can be utilized to provide a concentration equivalent to that of 0.025% in magenta ink.

Block 1310 of the embodiment of FIG. 13 includes ejecting at least one drop of ink onto a medium from at least one of at least two ink pens containing different colors of the ink. In some embodiments, the ink for a single ink pen can have a constant concentration of an IR absorbent dye throughout the ink supplied to the ink pen. As such, for example, when a single color ink is used, an ink drop ejected from a first of a multiple nozzle ink pen can have an absorbance that is similar to that of an ink drop ejected from a second nozzle, if the ink drops are similar in drop weight, when the intensity of IR light that is transmitted through or reflected by the ink drop on a medium is measured.

In some embodiments, measuring a distance from an ink mark deposited on a medium by the first nozzle relative to an ink mark deposited by the second nozzle can be used in confirming alignment of ink drops ejected from the first and second nozzles. Similarly, in some embodiments, measuring a distance from an actual position of impact of a drop ejected from a single nozzle relative to an intended position of impact can be used in confirming an appropriate trajectory for ink ejected by the single nozzle. In some embodiments, ink drops ejected from nozzles in two ink pens (e.g., an ink pen with magenta ink and an ink pen with cyan ink both having equivalent concentrations of an IR absorbent dye) can have a distance measured between the ink drops deposited on the medium to confirm alignment of ink drops ejected by one ink pen relative to ink drops ejected by the other ink pen.

Block 1320 of the embodiment of FIG. 13 includes illuminating a location on the medium at which the at least one drop from the at least one of the at least two ink pens is intended to impact and a location on the medium at which the at least one drop from the at least one of the at least two ink pens has actually impacted with an IR light source. Such illumination can be accomplished by an IR light source. In various embodiments of the present disclosure, locations on the medium can be illuminated with a light source emitting an IR wavelength range (e.g., an LED emitting around 850, 872, 895, and/or 940 nm) near a peak absorbance wavelength of a particular IR absorbent dye.

Block 1330 of the embodiment of FIG. 13 includes measuring absorbance of the IR light with a sensor of IR light intensity. In some embodiments, the peak sensitivity of the sensor of IR light intensity also can be around a peak absorbance wavelength of a particular IR absorbent dye.

Various embodiments, such as the embodiment of FIG. 13, can include using an IR absorbent dye from a group including SDA4927, SDA6122, SDA8680, SDA8700, and SDA8737. Some embodiments can include utilizing a particular concentration of the IR absorbent dye for each of the different colors of the ink so as to confer equivalent absorbance of the IR light by the different colors of the ink. Some embodiments can include allocating individual different colors of the inks to different ones of at least two ink pens.

Some embodiments can include detecting a difference between an intended location and an actual location of drop impact by measuring absorbance of the IR light at the actual location, calculation of the actual location, and comparison to the intended location. Detecting a difference between a first intended location of drop impact and a first actual location of drop impact and a second intended location of drop impact and a second location of drop impact to allow for determining alignment of a first ink pen relative to a second ink pen, can be provided in various embodiments. Some embodiments can include detecting a difference between the intended location of impact and the actual location of impact to allow for determining alignment of a one of the at least two ink pens ejecting drops of the ink one of the different colors relative to another of the at least two ink pens ejecting drops of the ink of another of the different colors.

Various embodiments can include illuminating with an IR light source using an LED emitting photons having a defined wavelength range. Using an LED having a defined wavelength range from about 750 nm to about 940 nm can also be provided in some embodiments.

In some embodiments, measuring absorbance of the IR light can be accomplished using a sensor having a sensitivity to a wavelength of IR light provided by the source at an intensity level ranging from approximately no absorption to approximately total absorption of the IR light can be provided. In various embodiments, a source of IR light and a sensor of IR light intensity can be located on a same side of the medium to measure absorbance by the medium and/or ink, with or without an IR absorbent dye, by reflection from the medium and/or ink.

Another example of a method includes ejecting at least one drop of ink onto a medium from at least one of multiple nozzles of at least one ink pen containing a mixture of an infrared light absorbent dye and the ink, illuminating, with an infrared light source, a location on the medium at which the at least one drop has impacted the medium, measuring absorbance of the infrared light with a sensor of infrared light intensity, and calibrating the ink pen firing based upon the measured absorbance.

Some embodiments can include determining a relative drop weight difference between drops ejected from a first and a second nozzle. This can be accomplished, for example, by measuring a difference between absorbance of IR light at the location at which at least one drop from the first nozzle has impacted and an absorbance of IR light at the location at which at least one drop from the second nozzle has impacted. Various embodiments can include determining the relative drop weight difference using at least two different color inks, wherein each ink is ejected from one of a first and a second nozzle, and wherein an ink drop weight from the first nozzle is substantially equal to an ink drop weight from the second nozzle or wherein an ink drop weight of a drop from the first nozzle is different from an ink drop weight of a drop from the second nozzle.

Various embodiments can include determining a relative dye load difference between drops ejected from a first and a second nozzle by measuring a difference between an absorbance of IR light at the location at which at least one drop from the first nozzle has impacted and the absorbance of IR light at the location at which at least one drop from the second nozzle has impacted. Some embodiments can include determining the relative dye load difference using at least two different color inks, wherein each ink is ejected from one of a first and a second nozzle, and wherein an ink drop dye load from the first nozzle is substantially equal to an ink drop dye load from the second nozzle or wherein a dye load of a drop from the first nozzle is different from a dye load of a drop from the second nozzle.

Various embodiments can include determining whether ink from a particular nozzle of a multiple nozzle ink pen is absent by detecting absence of IR light absorbance at a particular position in a pattern printed by the ink pen. Some embodiments can include determining whether ink from a particular nozzle is absent using at least two different ink colors by including a concentration of the IR light absorbent dye in the at least two different ink colors.

Unless explicitly stated, the method embodiments described herein are not constrained to a particular order or sequence. Additionally, some of the described method embodiments, or elements thereof, can occur or be performed at the same point in time.

The embodiments described herein can be performed by logic, hardware, application modules, or combinations of these elements, and the like, to perform the operations described herein and/or resident on the systems and devices shown herein or otherwise. Logic suitable for performing embodiments of the present disclosure can be resident in one or more devices or locations. Processing modules can include separate modules connected together or can include independent modules.

Variations on the approaches described herein are applicable in other image forming devices. For example, IR absorbent dyes can be utilized in toners used in laser printing devices.

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method, comprising:
   ejecting at least one drop of ink onto a medium from at least one of at least two ink pens containing different colors of the ink and an infrared light absorbent dye, wherein each of the different colors of the ink is mixed with the same infrared light absorbent dye and wherein one of the different colors of the ink is cyan-colored ink that is mixed with the infrared light absorbent dye;
   illuminating, with an infrared light source, a location on the medium at which the at least one drop from the at least one of the at least two ink pens is intended to impact and a location on the medium at which the at least one drop from the at least one of the at least two ink pens has actually impacted with an infrared light source; and
   measuring absorbance of the infrared light with a sensor of infrared light intensity.

2. The method of claim 1, wherein the infrared absorbent dye includes a particular concentration of the infrared absorbent dye for each of the different colors of the ink so as to confer equivalent absorbance of the infrared light by the different colors of the ink.

3. The method of claim 1, wherein the method includes allocating individual different colors of the inks to different ones of at least two ink pens.

4. The method of claim 1, wherein the method includes detecting a difference between an intended location and an actual location by measuring absorbance of the infrared light at the actual location, calculation of the actual location, and comparison to the intended location.

5. The method of claim 4, wherein detecting a difference between a first intended location of impact and a first actual location of impact and a second intended location of impact and a second actual location of impact allows for determining alignment of a first ink pen relative to a second ink pen.

6. The method of claim 4, wherein detecting a difference between the intended location of impact and the actual location of impact allows determining alignment of a one of the at least two ink pens ejecting drops of the ink of one of the different colors relative to another of the at least two ink pens ejecting drops of the ink of another of the different colors.

7. A method, comprising:
ejecting at least one drop of ink onto a medium from at least one of multiple nozzles of at least one ink pen of at least two ink pens containing different colors of the ink and an infrared light absorbent dye, wherein each of the different colors of the ink is mixed with the same infrared light absorbent dye and wherein one of the different colors of the ink is cyan-colored ink that is mixed with the infrared light absorbent dye;
illuminating, with an infrared light source, a location on the medium at which the at least one drop has impacted the medium;
measuring absorbance of the infrared light with a sensor of infrared light intensity; and
calibrating the ink pen firing based upon the measured absorbance.

8. The method of claim 7, wherein the method includes determining a relative drop weight difference between drops ejected from a first and a second nozzle by measuring a difference in absorbance of infrared light at the location at which at least one drop from the first nozzle has impacted and the absorbance of infrared light at the location at which at least one drop from the second nozzle has impacted.

9. The method of claim 8, wherein determining the relative drop weight difference is performed using at least two of the different color inks, wherein at least a first different color is ejected from the first nozzle and at least a second different color is ejected from the second nozzle, and wherein an ink drop weight from the first nozzle is substantially equal to an ink drop weight from the second nozzle.

10. The method of claim 8, wherein determining the relative drop weight difference is performed using drops ejected from at least the first and the second nozzle, and wherein an ink drop weight of a drop from the first nozzle is different from an ink drop weight of a drop from the second nozzle.

11. The method of claim 7, wherein the method includes determining a relative dye load difference between drops ejected from a first and a second nozzle by measuring a difference in absorbance of infrared light at the location at which the at least one drop from the first nozzle has impacted and absorbance of infrared light at the location at which the at least one drop from the second nozzle has impacted.

12. The method of claim 11, wherein determining the relative dye load difference is performed using at least two of the different color inks, wherein at least a first different color is ejected from the first nozzle and at least a second different color is ejected from the second nozzle, and wherein an ink drop dye load from the first nozzle is substantially equal to an ink drop dye load from the second nozzle.

13. The method of claim 11, wherein determining the relative dye load difference is performed using drops ejected from at least the first and the second nozzle, and wherein a dye load of a drop from the first nozzle is different from a dye load of a drop from the second nozzle.

14. The method of claim 7, wherein the method includes determining whether ink from a particular nozzle of a multiple nozzle ink pen is absent by detecting absence of infrared light absorbance at a particular position in a pattern printed by the ink pen.

15. An apparatus, comprising:
a print medium advancement mechanism;
at least two ink pens for ejecting ink drops onto the print medium, wherein each ink pen includes a concentration of a particular infrared light absorbent dye in a mixture with an ink such that the concentration provides an equivalent absorbance of infrared light of at least two ink pens, wherein each ink pen includes the same infrared light absorbent dye and wherein one of the ink pens contains cyan-colored ink mixed with the infrared light absorbent dye;
an infrared light source to illuminate a location on the print medium where ink containing the infrared absorbent dye can be deposited;
a sensor of infrared light intensity to measure absorbance of infrared light; and
a logic component to analyze infrared light intensity measurements obtained from sensing ink deposited on a surface of the print medium.

16. The apparatus of claim 15, wherein the logic component analyzes infrared light intensity measurements to enable adjustment of timing of ink drop ejection to calibrate for misalignment of at least one ink pen.

17. The apparatus of claim 15, wherein the logic component analyzes infrared light intensity measurements to enable adjustment of timing of ink drop ejection to calibrate for a particular nozzle that is not ejecting ink.

18. The apparatus of claim 15, wherein the logic component analyzes infrared light intensity measurements to enable adjustment of numbers of ink drops ejected to calibrate for a relative drop weight difference of one ink color to another ink color, a relative drop weight difference of a high and a low drop weight ink pen, and a relative dye load difference between different ink pens.

19. The apparatus of claim 15, wherein the logic component analyzes infrared light intensity measurements to enable detection of a counterfeit ink formulated from a mixture lacking the particular infrared light absorbent dye.

* * * * *